United States Patent
Appeldorn

(10) Patent No.: US 12,442,676 B2
(45) Date of Patent: Oct. 14, 2025

(54) DIFFERENTIATING BETWEEN FUEL AND WATER USING CAPACITIVE MEASUREMENT THEREOF

(71) Applicant: Microchip Technology Incorporated, Chandler, AZ (US)

(72) Inventor: Andy Appeldorn, Kansas City, MO (US)

(73) Assignee: Microchip Technology Incorporated, Chandler, AZ (US)

( * ) Notice: Subject to any disclaimer, the term of this patent is extended or adjusted under 35 U.S.C. 154(b) by 34 days.

(21) Appl. No.: 17/712,398

(22) Filed: Apr. 4, 2022

(65) Prior Publication Data

US 2022/0316935 A1     Oct. 6, 2022

Related U.S. Application Data

(60) Provisional application No. 63/171,058, filed on Apr. 5, 2021.

(51) Int. Cl.
*G01F 23/263* (2022.01)

(52) U.S. Cl.
CPC .......... *G01F 23/265* (2013.01); *G01F 23/266* (2013.01)

(58) Field of Classification Search
CPC .... G01F 23/265; G01F 23/266; G01F 23/268; G01F 23/26; G01F 23/263; G01F 23/242; G01F 23/241; G01F 23/804; G01N 27/22
USPC ...................................... 73/304 C
See application file for complete search history.

(56) References Cited

U.S. PATENT DOCUMENTS

| | | | |
|---|---|---|---|
| 4,864,857 A | 9/1989 | Koon | |
| 5,811,677 A | 9/1998 | Cournanc | 73/304 R |
| 6,564,630 B1 | 5/2003 | Klemp | 73/304 C |
| 8,146,421 B2 | 4/2012 | Jacobson et al. | 73/304 C |
| 8,176,778 B2 | 5/2012 | Schoenmakers et al. | 73/304 C |
| 2003/0000303 A1* | 1/2003 | Livingston | G01F 23/266 |
| | | | 73/304 C |
| 2006/0021432 A1 | 2/2006 | Salzmann et al. | |
| 2007/0216424 A1 | 9/2007 | Sieh et al. | |
| 2008/0202745 A1* | 8/2008 | Levy | G01F 23/268 |
| | | | 166/250.03 |
| 2009/0199635 A1 | 8/2009 | Jacobson et al. | |
| 2009/0320587 A1 | 12/2009 | Schoenmakers et al. | |
| 2010/0295565 A1 | 11/2010 | Drack | |

(Continued)

FOREIGN PATENT DOCUMENTS

| | | | | |
|---|---|---|---|---|
| CA | 2428940 A1 | 11/2003 | ........... | B01D 17/025 |
| CN | 1134652 C2 | 1/2004 | ............. | G01F 23/26 |

(Continued)

OTHER PUBLICATIONS

CN 1134652 C2, U.S. Pat. No. 5,811,677 A.
International Search Report and Written Opinion, Application No. PCT/US2022/023302, 13 pages, Jul. 12, 2022.
Bohn, Bruce, "AN1250: Microchip CTMU for Capacitive Touch Applications," Microchip Technology Incorporated, Application Note, URL: http://ww1.microchip.com/downloads/en/AppNotes/01250a.pdf, 22 pages, Jan. 16, 2009.

(Continued)

*Primary Examiner* — John E Breene
*Assistant Examiner* — Truong D Phan
(74) *Attorney, Agent, or Firm* — SLAYDEN GRUBERT BEARD PLLC

(57) ABSTRACT

An apparatus includes a measurement circuit to be coupled to a sensor electrode at a vertical position of a container. The container is to include two fluids. The measurement circuit is to make a determination of a height of one of the fluids with respect to the other of the fluids based on a capacitive measurement of the sensor electrode.

17 Claims, 15 Drawing Sheets

(56) References Cited

U.S. PATENT DOCUMENTS

| | | |
|---|---|---|
| 2011/0234246 A1 | 9/2011 | Qui |
| 2019/0086253 A1* | 3/2019 | Ihle ................... G01F 23/265 |
| 2020/0271504 A1 | 8/2020 | Yoshino et al. |

FOREIGN PATENT DOCUMENTS

| | | | |
|---|---|---|---|
| CN | 201311315 Y | 9/2009 | ............ G01F 23/26 |
| CN | 102052951 A | 5/2011 | ............ G01F 23/24 |
| CN | 202453034 U | 9/2012 | ............ G01F 23/26 |
| CN | 111623808 A | 9/2020 | ............... G01D 5/24 |
| CN | 212066631 U | 12/2020 | ............ A47L 11/28 |
| EP | 2071301 A1 | 6/2009 | ............ G01F 23/24 |
| JP | 11108735 A * | 4/1999 | |
| TW | 200745518 A | 12/2007 | ............ G01F 23/26 |

OTHER PUBLICATIONS

Atmel, "AT09363: PTC Robustness Design Guide," Atmel QTouch Application Note, URL: http://ww1.microchip.com/downloads/en/appnotes/atmel-42360-ptc-robustness-design-guide_applicationnote_at09363.pdf, 35 pages, May 1, 2016.

Layton, Jason et al., "TB3198: Capacitive Voltage Divider (CVD) Operation on 8-bit PIC® Microcontrollers," Microchip Technology Incorporated, Application Note, URL: http://ww1.microchip.com/downloads/en/Appnotes/TB3198_CVD_90003198A.pdf, 12 pages, Oct. 4, 2017.

Chinese Office Action, Application No. 202280007521.2, 18 pages.

\* cited by examiner

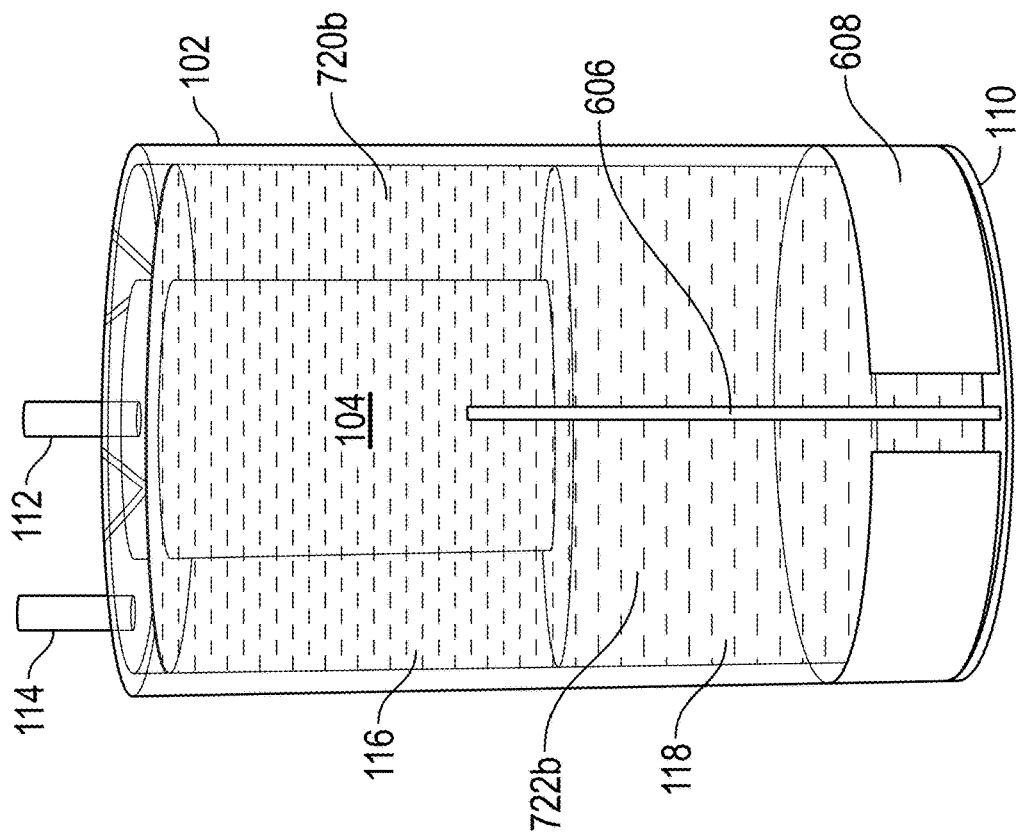
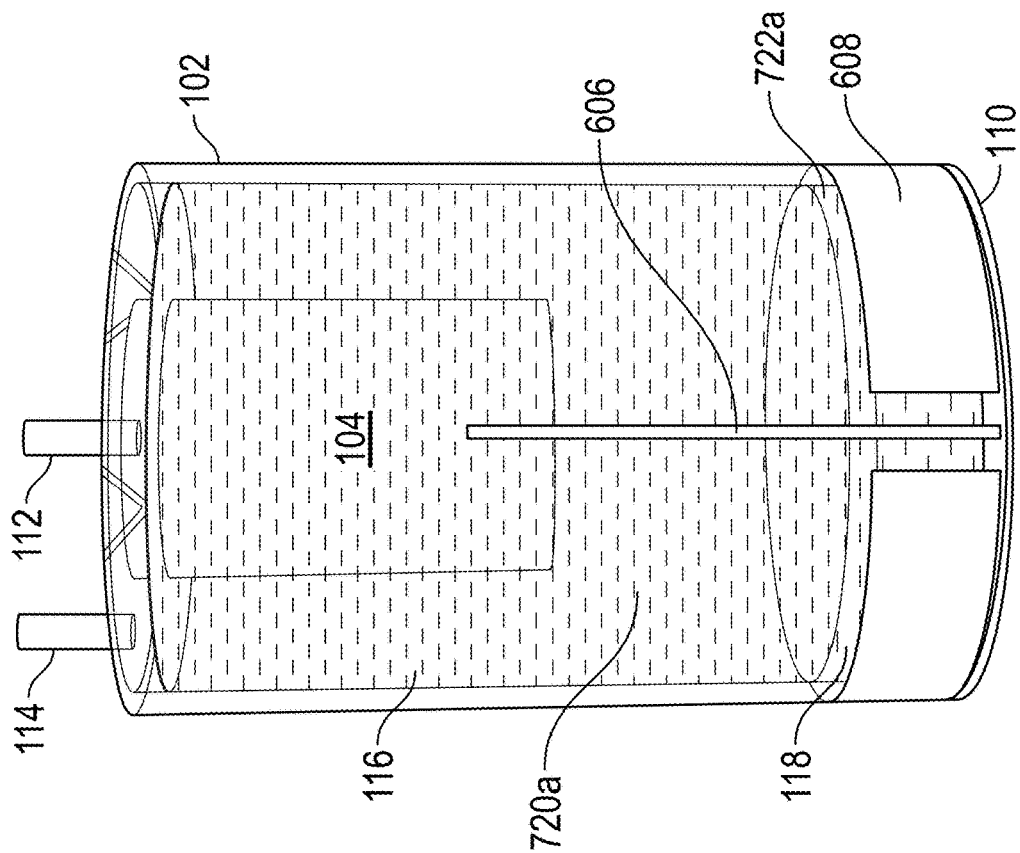

DIFFERENTIATING BETWEEN FUEL AND WATER USING CAPACITIVE MEASUREMENT THEREOF

PRIORITY

The present application claims priority to U.S. Provisional Patent Application No. 63/171,058 filed Apr. 5, 2021, the contents of which are hereby incorporated in their entirety.

TECHNICAL FIELD

The present disclosure relates to capacitive measurement of two fluids, and, more particularly, to identifying a level of one of two fluids in a container using measured capacitances thereof.

BACKGROUND

Diesel fuel contains moisture, specifically, often water, which may separate more from the diesel fuel as temperature changes. Such water, if injected into an engine, may cause the engine to run poorly or cause damage to the engine. In a container, the water and fuel may separate.

In a given container, to determine a level of the water, as opposed to the fuel, other solutions may include a mechanical float. Such a float must be configured to float at the dividing line of the water and the fuel, and thus must be less dense than the water but denser than the fuel. Moreover, the mechanical nature of the float means that the float may fail over time as its moving parts are moved out of alignment. Moreover, this may require tuning during manufacturing. Also, this solution may experience corrosion of various parts that are exposed to water and to fuel. Still other solutions may include measurements of resistance. However, this may require contact between resistance sensors and the fuel or water. This too may experience corrosion of various parts that are exposed to water and to fuel. In addition, still other solutions may include optical sensors. These may be prohibitively expensive.

The above has been particularly described in relation to fuel and water, it being understood that this is simply a particular example of two different fluids, for which a level of one of them is desired to be determined.

The inventor of examples of the present disclosure has discovered examples that address one or more of these aspects of the prior art.

BRIEF DESCRIPTION OF THE DRAWINGS

A more complete understanding of the present disclosure may be acquired by referring to the following description taken in conjunction with the accompanying drawings.

FIGS. 7A and 7B are semi-transparent diagrams of a container comprising external capacitive fluid level sensors and showing different fluid levels inside of the container, according to specific examples of this disclosure.

Figure 1:
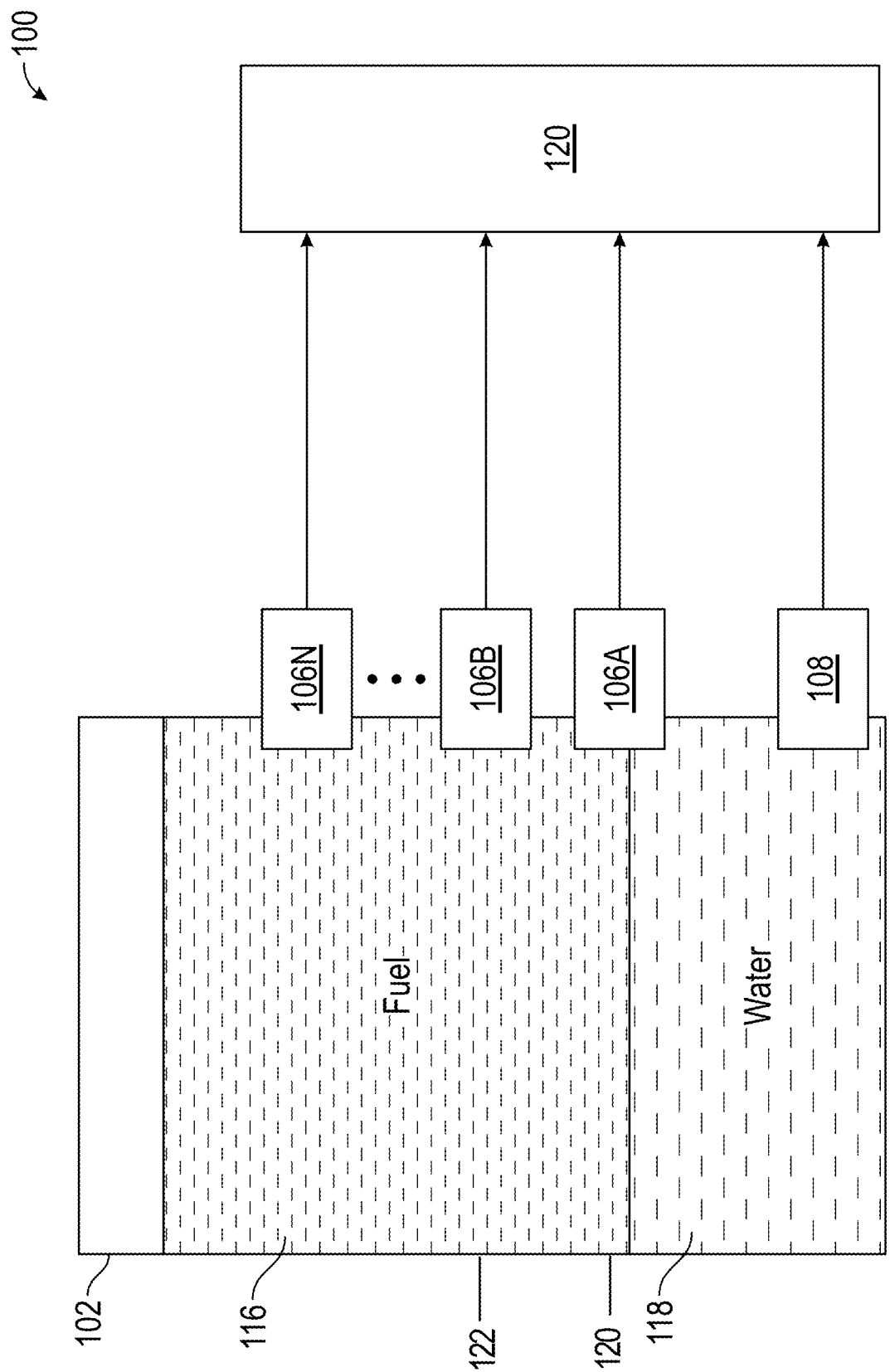
FIG. 1 is a diagram of a system for differentiating between fuel and water using capacitive measurements, according to examples of the present disclosure.

While the present disclosure is susceptible to various modifications and alternative forms, specific examples thereof have been shown in the drawings and are herein described in detail. It should be understood, however, that the description herein of specific examples is not intended to limit the disclosure to the forms disclosed herein.

DETAILED DESCRIPTION

Examples of the present disclosure include an apparatus. The apparatus includes a measurement circuit. The measurement circuit may be implemented by analog circuitry, digital circuitry, instructions for execution by a processor, or by any suitable combination thereof. The Measurement circuit may be configured to measure the relative height of a first fluid with respect to a second fluid in a container. The measurement circuit may be coupled to a ground electrode and a first sensor electrode of the container. The first fluid may be water. The second fluid may be a fuel such as diesel. The fluids may be immiscible with respect to each other such that a boundary between the fluids is present, as the fluids might not mix. The measurement circuit may determine a height of this boundary between the fluids. The measurement circuit may make a determination of a height of the first fluid with respect to the second fluid based on a capacitive measurement of the first sensor electrode.

In combination with any of the above examples, the ground electrode and first sensor electrode may be implemented in any suitable manner. The ground electrode and first sensor electrode may be implemented by bands around the circumference of the inside or outside of the container. The ground electrode and first sensor electrode may be implemented within a sealed interior container within the fluid container. The ground electrode may be implemented by a band around most, but not all, of the circumference of the container and the sensor electrode may be implemented by a pole or metal projection from a bottom of the container upwards. In some examples, one or more second sensor electrodes may be implemented in the same was as the first sensor electrode.

In combination with any of the above examples, the measurement circuit may be coupled to the ground electrode of the container. The ground electrode to provide a ground reference for the capacitive measurement of any sensor electrodes.

In combination with any of the above examples, the first fluid and the second fluid may be immiscible with respect to one another In combination with any of the above examples, the first fluid may be of a different dielectric value than the second fluid. The different dielectric may cause a different capacitance to be read by the measurement circuit at different fluid levels.

In combination with any of the above examples, the measurement circuit may be to determine that the first fluid is proximate to the first sensor electrode based upon a determination that the capacitive measurement exceeds a threshold.

In combination with any of the above examples, the measurement circuit may be to determine that the second fluid is proximate to the first sensor electrode based upon a determination that the capacitive measurement is below the threshold.

In combination with any of the above examples, the measurement circuit may be coupled to a second sensor electrode of a second vertical position of the container. The second vertical position may be above the first vertical position. The measurement circuit may perform a capacitive measurement of the second sensor electrode and, based upon a determination of the capacitive measurements of the first and second sensor electrodes, determine a vertical position of an interface between the first fluid and the second fluid.

In combination with any of the above examples, wherein the first sensor electrode may be capacitively coupled to a one of the first fluid or the second fluid that is proximate to the first sensor electrode.

Referring now to the drawings, the details of examples are schematically illustrated. Like elements in the drawings will be represented by like numbers, and similar elements will be represented by like numbers with a different lower-case letter suffix.

FIG. 1 is a diagram of a system 100 for differentiating between fuel and water using capacitive measurements, according to examples of the present disclosure. Fuel and water are provided as a non-limiting example of fluids for which system 100 may be applied.

A combination of fuel 116 and water 118 may be stored in a container 102. Fuel 116 may be of any suitable substance, such as those substances that are immiscible with water. For example, fuel 116 may be diesel fuel, also known simply as diesel. In another examples, fuel 116 may be gasoline, diesel, or liquid propane. Moreover, although fuel 116 and water 118 are used as examples, any first and second kind of fluid that are immiscible with respect to one another may be used.

Diesel may include a certain amount of water. The water may separate from the diesel over time. Furthermore, the amount of water that will separate from the diesel over a given time period may be dependent upon temperature and other environmental variables. In the example of diesel, water may settle to the bottom of container 102 and the diesel may rise above the level of the water in container 102. Thus, as shown in FIG. 1, fuel 116 may be on top of water 118 in container 102. In other examples, where different fuels are used, fuel 116 may be on bottom of water 118 in container 102.

Container 102 may be a container wherein fuel 116 is stored before use. Fuel 116 may be drained or taken from a point in container 102 that is likely to have fuel 116 but not water 118. If a level of water 118 rises too high in container 102, wherein water 118 would be taken from container 102 instead of fuel 116, corrective action may be taken, such as alerting a user of system 100, draining water 118, or any other suitable actions. Initially, container 102 might only contain fuel 116 as fuel is added to container 102. However, even if fuel 116 initially completely fills container 102, water that is within fuel 116 may separate and appear as water 118. Some of fuel 116 may be used. This fuel may be taken at an elevation in container 102 that is safely determined as not having water 118. More fuel may be added to container 102 to replace the fuel that was used. This additional fuel may in turn have some water, which again may separate and with the separated water added to water 118. Thus, over time, adding additional fuel may eventually cause container 102 to become unacceptably full of water 118, such that water 118 might otherwise be taken from container 102 to be used as fuel, instead of fuel 116. System 100 may be configured to determine when such a level of water 118 has reached a predetermined limit level, displacing fuel 116.

System 100 may be configured to determine a level of water 118 compared to fuel 116 in any suitable manner. For example, system 100 may be configured to measure the relative capacitance of the fluids in container 102.

System 100 may include a ground electrode 108 and one or more sensor electrodes 106. Each one of sensor electrodes 106, in cooperation with ground electrode 108, may be configured to operate as a capacitor. In each such capacitor, ground electrode 108 may be a first plate of the capacitor, and a respective one of sensor electrodes 106 may be the second plate of the capacitor. The dielectric of such a capacitor may be the portion of container 102 or a sensor housing (not shown, see, e.g., FIGS. 4-5) and the fluid between the electrodes, which electrodes may be separated by a fixed distance. The container forms part of the dielectric as it is in the charge path between sensor and ground. Two or more predetermined levels may be provided, each of the predetermined levels associated with a particular one of sensor electrodes 106.

Any suitable number of sensor electrodes 106 may be used. Electrodes 106, 108 may be implemented by any suitable metal or conductive material. Container 102 might be implemented as a non-conductive or an insulating material. Ground electrode 108 may be placed at a vertical location wherein ground electrode 108 is likely to be at a level at or below the top of water 118. Sensor electrodes 106 may be placed at vertical locations wherein it may be desired to be known whether water 118 has reached the position of sensor electrode 106—i.e., if the level of water 118 has reached the predetermined level associated with the vertical position of sensor electrode 106. If one instance of sensor electrode 106 is to be used, then sensor electrode 106 may be placed at a vertical location wherein water 118 at that level may be at risk for being output from container 102 in place of fuel 116. For example, sensor electrode 106 may be placed at a vertical location in anticipation of water 118 reaching a fuel pump, outlet, filter, or other element.

In one example, electrodes 106, 108 may be implemented externally to container 102. Thus, electrodes 106, 108 do not come into contact with water 118 or fuel 116. In another example, electrodes 106, 108 may be implemented internally in container 102. In such an example, electrodes 106, 108 may be included within a housing (not shown in FIG. 1, see, e.g., FIGS. 4-5). Such a housing may be sealed such that electrodes 106, 108 do not come into contact with water 118 or fuel 116.

Each of electrodes 106, 108 may be connected to a measurement circuit (MC) 120 configured to perform capacitance measurements. Thus, MC 120 may be configured to be coupled to electrodes 106, 108. MC 120 may be implemented in any suitable manner. For example, MC 120 may be implemented by a microcontroller, microprocessor, chip, die, integrated circuit, field programmable gate array, application specific integrated circuit, digital circuitry, analog circuitry, instructions in a machine-readable medium for execution by a processor, or any suitable combination thereof. For example, MC 120 may be implemented by a microcontroller adapted to measure relative capacitance, such as those used in touch applications. For example, MC 120 may be implemented by a microcontroller with peripherals such as a peripheral touch controller (PTC), analog to digital converter (ADC), or charge time measurement unit (CTMU). An example of such a microcontroller is the ATTINY3217 microcontroller, available from the assignee of the present disclosure. MC 120 may be configured to perform any suitable measurement to evaluate the capacitance between a given sensor electrode 106 and ground electrode 108. For example, MC 120 may be configured to perform capacitive voltage divider (CVD) circuit measurements, or charge transfer measurements. MC 120 may be configured to determine a relative shift in capacitance values, rather than a specific capacitance value.

However, container 102 or sensor housing (not shown) may be in contact with the fluids inside container 102 on the other side from electrodes 106, 108. The fluid may be capacitively coupled with electrodes 106, 108 and thus affect the capacitance measurements between electrodes 106, 108. Moreover, fuel 116 and water 118 may have distinctly different dielectric constants. Fuel 116 may have a dielectric constant of approximately 2-3.5. Water 118 may have a much higher dielectric constant, of approximately 78.4. Thus, fuel 116 and water 118, when reaching each of sensor electrodes 106, may have disparate impacts upon capacitance measurements performed by MC 120. For example, when fuel 116 is at the level of sensor electrode 106A, fuel 116 may provide a certain charge capacity of the capacitor formed by sensor electrode 106A and ground electrode 108. Thus, during a test of the capacitance of sensor electrode 106A, a certain amount of charge may be transferred between sensor electrode 106A and ground electrode 108. Conversely, when water 118 is at the level of sensor electrode 106A, water 118 may increase the charge capacity of the capacitor formed by sensor electrode 106A and ground electrode 108 as compared to the charge capacity when fuel 116 is at the level of sensor electrode 106A. Thus, during a test of the capacitance of sensor electrode 106A, there might be greater charge transferred between sensor electrode 106A and ground electrode 108 than the amount of charge may be transferred between sensor electrode 106A and ground electrode 108 when fuel 116 is at the level of sensor electrode 106A. The capacitance when water 118 is at the level of sensor electrode 106A might be greater than the capacitance when fuel 116 is at the level of sensor electrode 106A. Similar tests might be performed on the capacitors formed between each of sensor electrodes 106. Thus, MC 120 may be configured to measure the relative capacitance between electrodes 106, 108.

MC 120 may be configured to measure the relative capacitance between electrodes 106, 108. MC 120 may be configured to measure this capacitance upon any suitable criteria, such as periodically. MC 120 may be configured to compare the measured capacitance against, for example, thresholds indicating whether fuel 116 or water 118 is at the level of a given sensor electrode 106. If the capacitance reaches the threshold of capacitance corresponding to water 118, then it may be determined that water 118 has reached the predetermined level associated with the given sensor electrode 106. In another example, MC 120 may be configured to compare the measured capacitance from a given time against measured capacitance from a previous given time. If the capacitance has increased between the measurements by at least a specified amount, it may be determined that water 118 has reached the given sensor electrode 106. MC 120 may be configured to provide an indication of the capacitance between the given sensor electrode 106 and ground electrode 108. The indication may be dependent upon the specific capacitance test methodology employed by MC 120. The indication may be representative of a height of water 118 in container 102. Specifically, the indication may be representative of whether water 118 or fuel 116 is proximate to the sensor electrode 106.

Water 118 and fuel 116 may form an interface on the boundary between the two fluids. As sensor electrode 106 is placed at a vertical position on container 102, when the capacitance measured from sensor electrode 106 exceeds the threshold, MC 120 may be configured to determine a height of water 118 in container 102, by way of determining that water 118 is proximate to, or at least as high as the vertical level of, sensor electrode 106. Thus, if the capacitance measured from sensor electrode 106 is below the threshold, MC 120 may be configured to determine that fuel 116 is proximate to sensor electrode 106. Sensor electrode 106 may be capacitively coupled to the fluid—fuel 116 or water 118—that is proximate to the vertical position of sensor electrode 106.

A ground reference for the capacitance measurement and the fluid of container 102 may be achieved through a ground plane caused by ground electrode 108 capacitively coupling to the fluid inside container 102. Similarly, sensor electrodes 106 may provide a horizontal conductive plane across the level of container 102 at a vertical position corresponding to the vertical position of the given sensor electrode 106. Sensor electrodes 106 may also be capacitively coupled to the fluid in container 102. Thus, a sensor electrode 106 may be placed at a vertical position corresponding to a full water line, wherein water 118 reaching such a level may cause MC 120 to perform corrective actions. As shown in FIG. 1, a first sensor electrode 106A may be at a first vertical position 120, and a second sensor electrode 106B may be at a second vertical 122 position above sensor electrode 106A. Moreover, additional sensor electrodes 106C-106N may be at additional vertical positions above sensor electrodes 106A-106B.

MC 120 may be configured to use a reference sensor or reference values (not shown) to be used as a calibration source for environmental changes. As temperature and humidity changes, the internal capacitance of components of system 100 may fluctuate, which may create error in the measurement. The reference sensor or reference values may be used to adjust measurements. The reference sensor may be implemented by a sensor connected to MC 120. The reference sensor may be isolated from liquid of container 102. The reference sensor may be used to create an offset value for measurements when the environment changes. The offset may arise from the change of internal capacitance in MC 120 or other portions of system 100.

In examples wherein electrodes 106, 108 are implemented externally to container 102, container 102 might be implemented with a non-conductive or an insulating material. For example, container 102 may be made from plastic. If container 102 were made from a conductive material, container 102 might interfere with the charge transfer path used to measure capacitance. In examples wherein electrodes 106, 108 are implemented internally to container 102, container 102 may be implemented with conductive or nonconductive materials.

Ground electrode 108 may be designed with as large of a surface area as possible to cover container 102. In addition, ground electrode 108 may have a surface area that is proportional to the wall thickness of container 102. In one example, the surface area of ground electrode 108 may be at least larger than the squared product of the surface area of sensor electrode 106 and wall thickness of container 102.

Ground electrode 108 may capacitively couple liquid inside of container 102 with ground. Water 118 may have a higher conductance than fuel 116, due to differences in permittivity as discussed above. Once water 118 displaces fuel 116 to the level of a given sensor electrode 106, the conductive ground reference may cause a capacitance shift to be detected by MC 120 using a charge transfer process.

Sensor electrode 106 may be implemented as a limit sensor, which may sense when water 118 has reached a vertical level of sensor electrode 106. Thus, multiple instances of sensor electrode 106 may be used to determine a variety of vertical levels of water 118. Example implementations of limit sensor usage are illustrated in FIGS. 2-5. In another example, sensor electrode 106 may be implemented as a linear sensor, which may sense a change in depth or vertical level of water 118 as water 118 covers more and more of sensor electrode 106. Example implementations of linear sensor usage are illustrated in FIGS. 6-7.

Figure 2B:
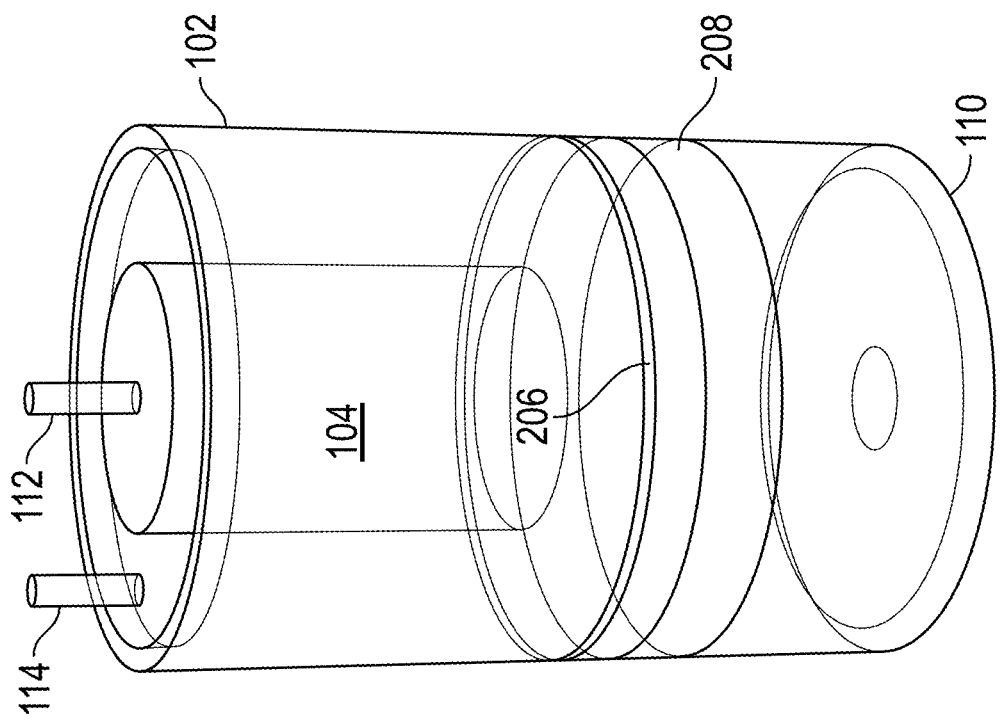
FIGS. 2A and 2B are semi-transparent diagrams of a container comprising external capacitive sensors, according to specific examples of this disclosure.
Figure 2A:
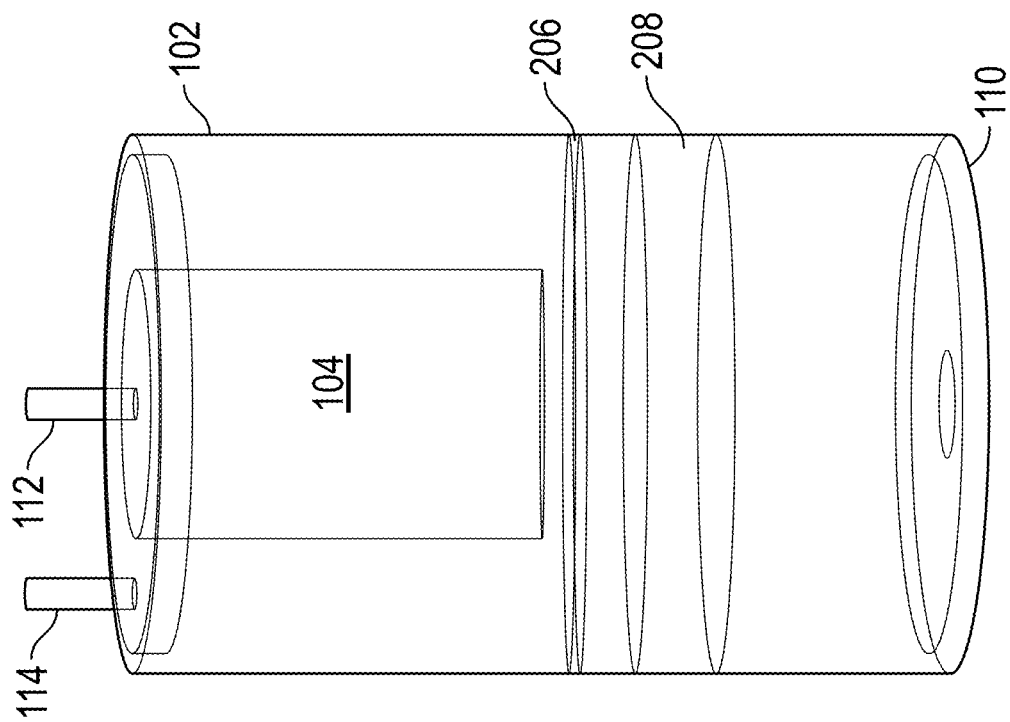

In the example of FIGS. 2A and 2B, wherein container 102 is non-conductive, the greater the surface area of ground electrode 208, the better coupling of the fluid inside container 102 to ground, which may provide enhanced sensitivity. In other examples, such as in FIGS. 4 and 5, wherein container 102 is conductive, ground electrode 408 may be directly coupled to its enclosure therein.

FIGS. 2A and 2B are semi-transparent diagrams of a container comprising external capacitive sensors, according to specific examples of this disclosure. FIGS. 2A and 2B may illustrate a further implementation of container 102, with a further implementation of ground electrode 108 in the form of ground electrode 208, and a further implementation of an instance of sensor electrode 106 in the form of sensor electrode 206. MC 120 is not shown in this drawing but is connected to electrodes 206, 208.

Container 102 may be made of an electrically nonconductive wall material. Container 102 may further enclose a filter 104. Filter 104 may provide additional protection against water being accidentally provided from container 102. Container 102 may include a fuel inlet port 114 configured to receive fuel. Container 102 may include a fuel outlet port 112 configured to provide fuel through filter 104. Container 102 may include a nonconductive bottom 110.

In the example of FIGS. 2A and 2B, electrodes 206, 208 may be bands around the entirety or a portion of the circumference of the exterior of container 102. Electrodes 206, 208 may be adhered to the outside of container 102.

The vertical height of sensor electrode 206 may be relative to the thickness of the sidewall of container 102. The vertical height of sensor electrode 206 may be equal or greater than container 102 wall thickness. The greater the surface area of sensor electrode 206, the better the coupling to the fluid inside container 102, which may result in better sensitivity. However, as the surface area of sensor electrode 206 grows, the parasitic capacitance increases and may exceed past the measurable limit of MC 102. The parasitic capacitance may be due to various elements of system 100, such as the total surface area of sensor electrode 206. If the total surface area of sensor electrode 206 is too large, it may be affected by other electrical capacitances caused by interactions with other portions of system 100. These additional capacitances, when added to the capacitance between sensor electrode 206 and ground electrode 208 to be detected, may result in a sensor capacitance that exceeds the capabilities of MC 102. Capacitance between sensor electrode 206 and ground electrode 208 may be designed to be less than 35 pF. As capacitance increases beyond this value, sensitivity may be lost.

Figure 3B:
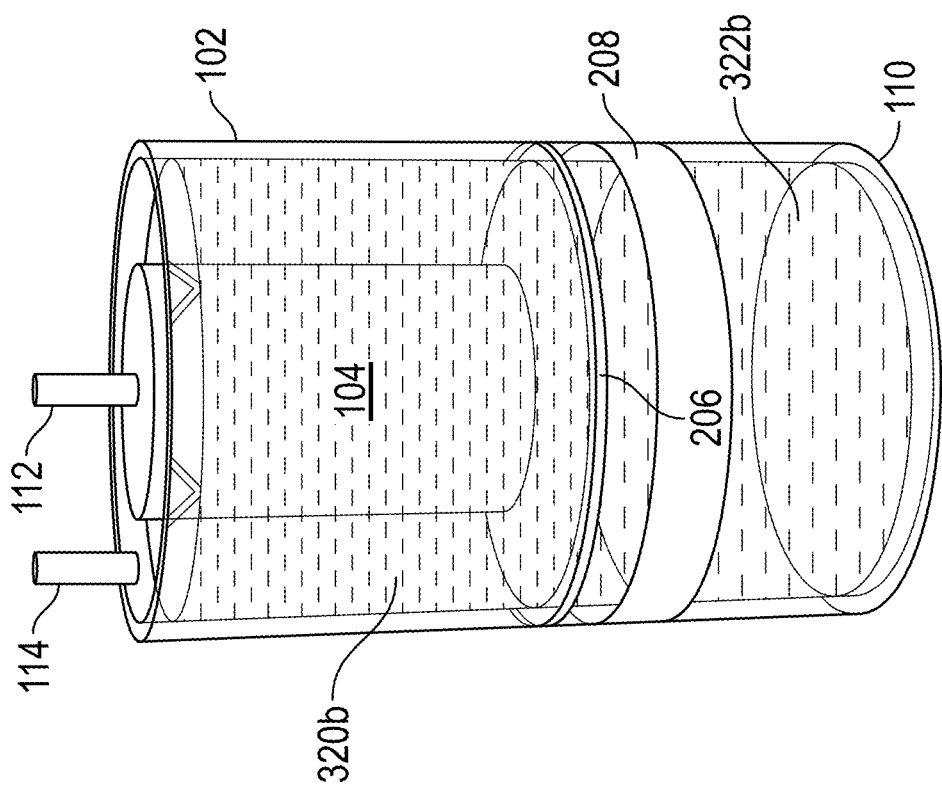
FIGS. 3A and 3B are semi-transparent diagrams of container a comprising external capacitive sensors and showing different fluid levels inside of the container, according to specific examples of this disclosure.
Figure 3A:
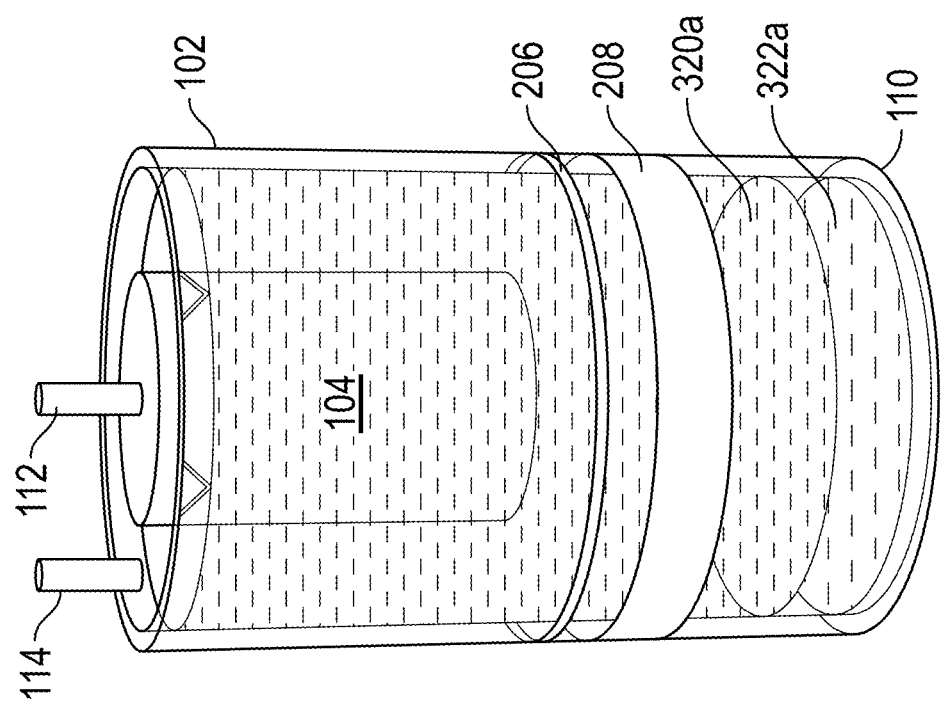

FIGS. 3A and 3B are semi-transparent diagrams of a container comprising external capacitive sensors and showing different fluid levels inside of the container, according to specific examples of this disclosure. For example, FIGS. 3A and 3B may illustrate water and fuel at different levels for a container 102 as shown in FIGS. 2A and 2B.

In FIG. 3A, water 322a may be at a level substantially below that of sensor electrode 206. The rest of container 102 may be filled with fuel 320a. In FIG. 3B, at a later time, water 322b may have risen above that of sensor electrode 206. The rest of container 102 may be filled with fuel 320b. When the water (322b) level is proximate and above the sensor electrode 206, a change in capacitance may be detected by MC 120. This may be an increase in capacitance. MC 120 may interpret this increase in capacitance as a transition between fuel and water being at the level of sensor electrode 206.

Figure 4C:
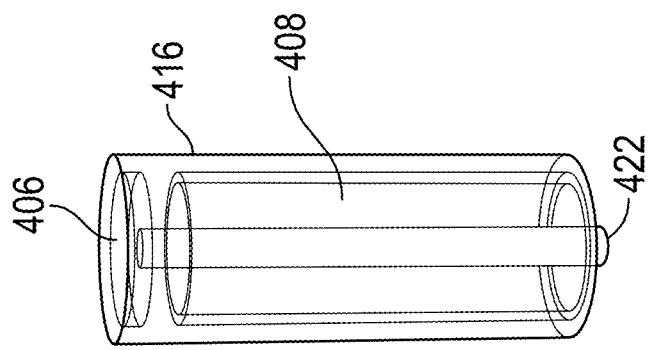
FIGS. 4A, 4B, and 4C are semi-transparent diagrams of a container comprising internal capacitive sensors, according to specific examples of this disclosure.
Figure 4B:
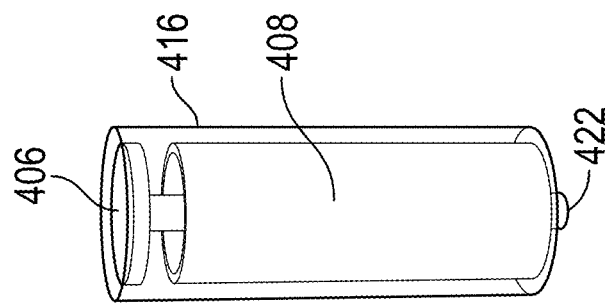
Figure 4A:
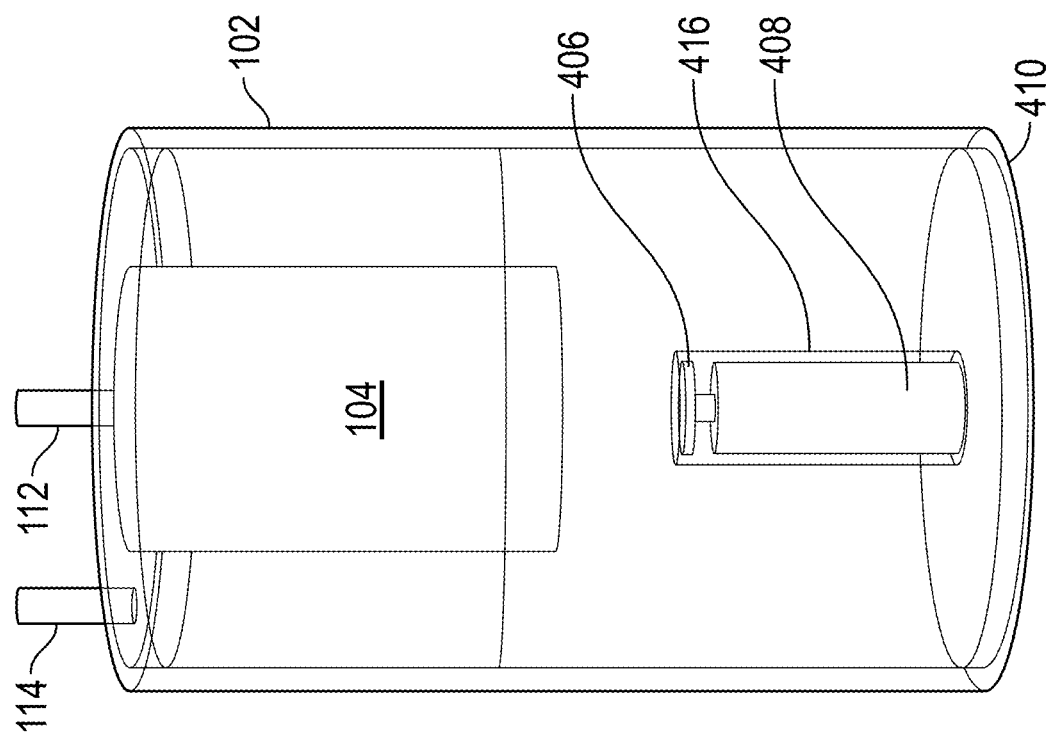

FIGS. 4A, 4B, and 4C are semi-transparent diagrams of a container comprising internal capacitive sensors, according to specific examples of this disclosure. FIGS. 4A, 4B, and 4C may illustrate a further implementation of container 102, with a further implementation of ground electrode 108 in the form of ground electrode 408, and a further implementation of an instance of sensor electrode 106 in the form of sensor electrode 406. MC 120 is not shown in this drawing but is connected to electrodes 406, 408. Container 102 may be made of an electrically nonconductive or conductive wall material. Container 102 may include a conductive bottom 410.

Container 102 may include an enclosure 416. Enclosure 416 may be sealed such that its contents are isolated from fuel and water in container 102. Enclosure 416 may be installed on the bottom-center of container 102. Enclosure 416 may include ground electrode 408 and sensor electrode 406. Enclosure 416 may include a conducting stand 422 upon which sensor electrode 406 may be mounted. Conducting stand 422 may include a non-conducting exterior and an interior for wires to connect sensor electrode 406 to MC 120 (not shown). FIG. 4B illustrates an enlarged view of enclosure 416, and FIG. 4C illustrates an enlarged view of enclosure 416 with a semi-transparent view of ground electrode 408.

Figure 5A:
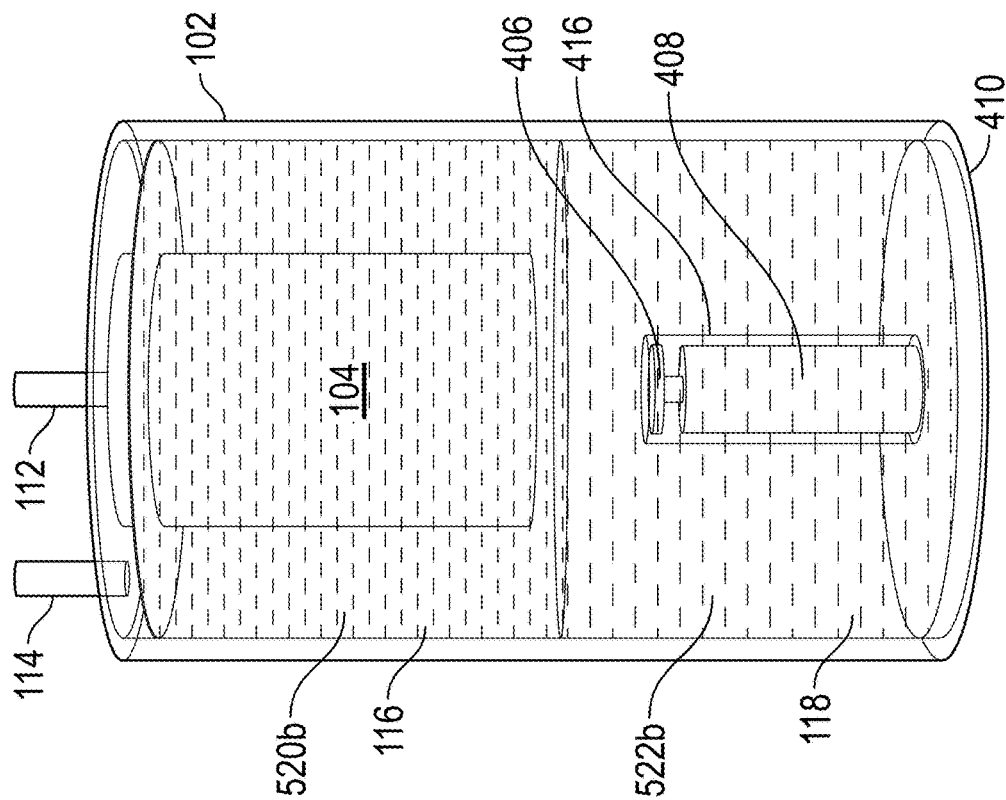
FIGS. 5A and 5B are semi-transparent diagrams of a container comprising internal capacitive sensors and showing different fluid levels inside of the container, according to specific examples of this disclosure.
Figure 5B:
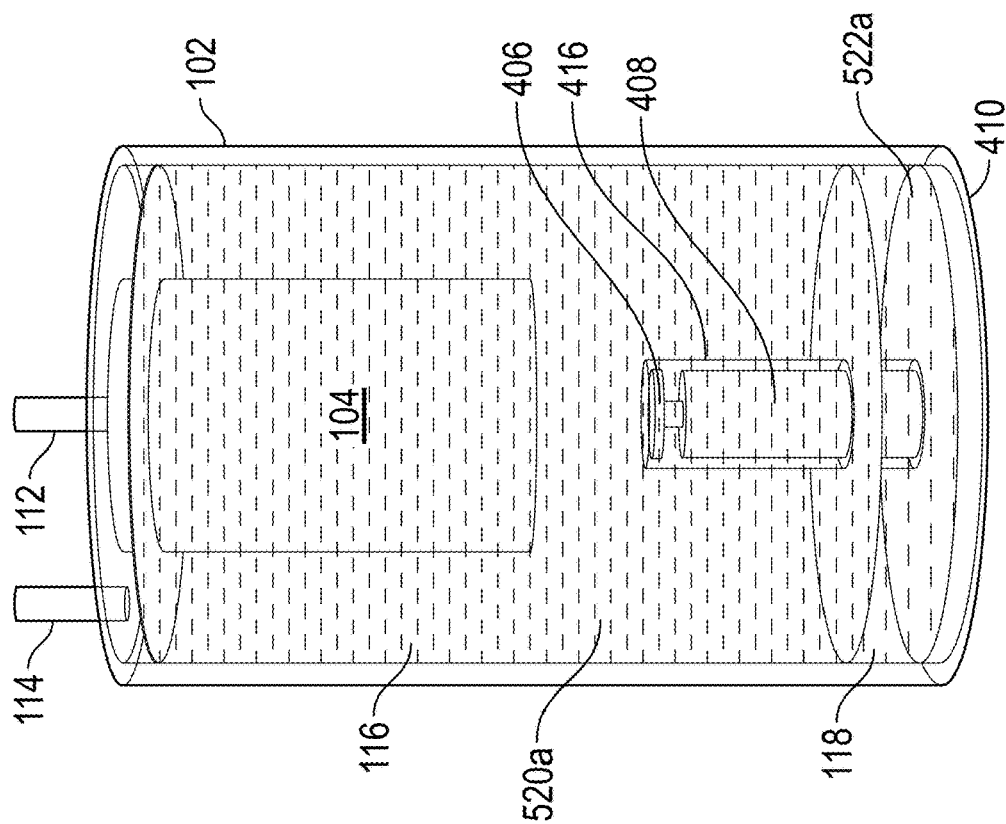
Figure 6:
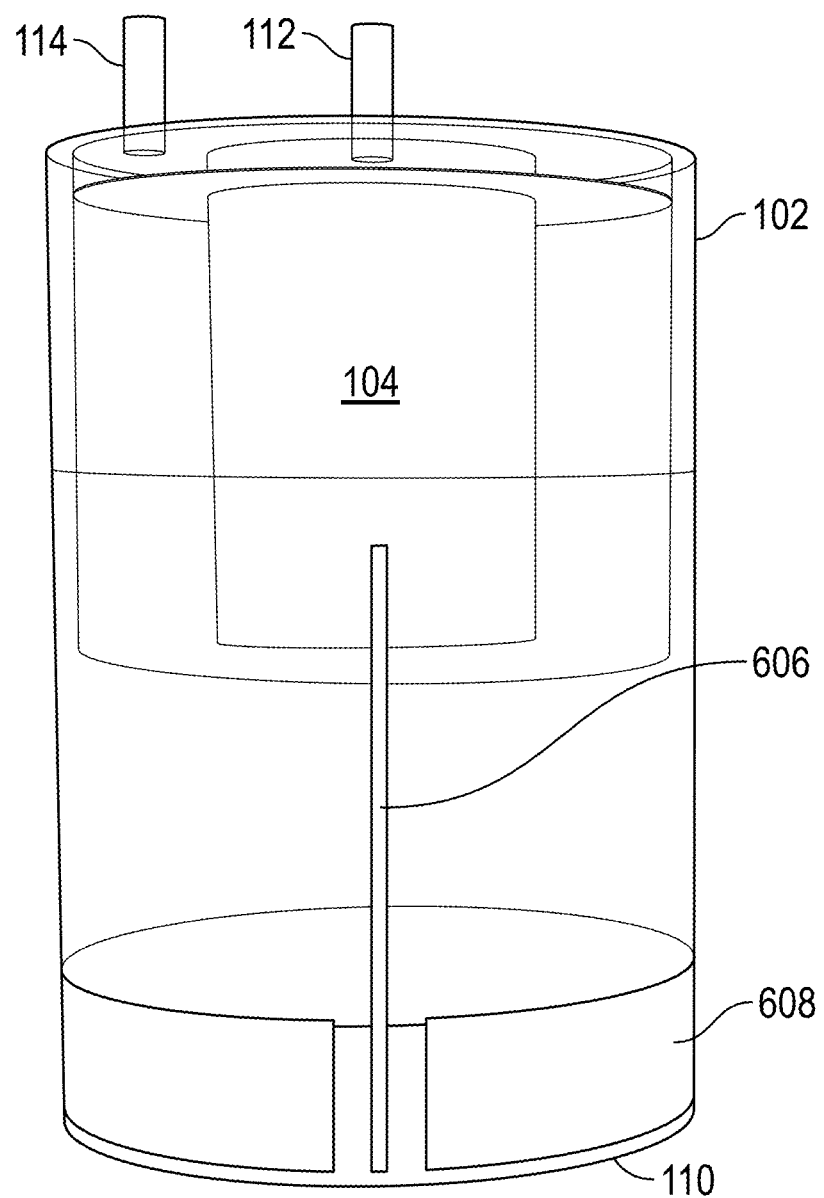
FIG. 6 is a semi-transparent diagram of a container comprising external capacitive fluid level sensors, according to specific examples of this disclosure.

FIGS. 5A and 5B are semi-transparent diagrams of a container comprising internal capacitive sensors and showing different fluid levels inside of the container, according to specific examples of this disclosure. For example, FIGS. 5A and 5B may illustrate water and fuel at different levels for a container 102 as shown in FIGS. 4A-4C.

In FIG. 5A, water 522a may be at a low level substantially below sensor electrode 406. The rest of container 102 may be filled with fuel 520a. In FIG. 5B, at a later time, water 522b may have risen above the level of sensor electrode 406. The rest of container 102 may be filled with fuel 520b. When the water (522b) level is proximate and above sensor electrode 406, a change in capacitance may be detected by MC 120. This may be an increase in capacitance. MC 120 may interpret this increase in capacitance as a transition between fuel and water being at the level of sensor electrode 406.

FIG. 6 is a semi-transparent diagram of another implementation of a container comprising external capacitive fluid level sensors, according to specific examples of this disclosure. Container 102 of FIG. 6 may differ from the implementation of container 102 of FIGS. 2A and 2B in terms of implementation of its electrodes and its ability to measure ratio of fuel to water in container versus full and empty. FIG. 6 may illustrate a further implementation of container 102, with a further implementation of ground electrode 108 in the form of ground electrode 608, and a further implementation of an instance of sensor electrode 106 in the form of sensor electrode 606. MC 120 is not shown in this drawing but is connected to electrodes 606, 608. Container 102 may be made of an electrically nonconductive wall material.

Sensor electrode 606 may be vertically disposed on the outside of container 102. Ground electrode 608 may be horizontally disposed on the outside of container 102. Ground electrode 608 may be implemented as a band. In one example, a gap may be included in ground electrode 608 so that ground electrode 608 does not wrap around the entirety of the circumference of container 102. This may prevent coupling of sensor electrode 606 to ground electrode 608. Sensor electrode 606 may extend down to a vertical position as low as the lower edge of ground electrode 608, and positioned within the gap. Sensor electrode 606 may extend up as far as it is desired to be able to detect fluid levels in system 100.

FIGS. 7A and 7B are semi-transparent diagrams of a container comprising external capacitive fluid level sensors and showing different fluid levels inside of the vessel, according to specific examples of this disclosure. For example, FIGS. 7A and 7B may illustrate water and fuel at different levels for a container 102 as shown in FIG. 6.

In FIG. 7A, water 722a may be at a low level substantially below a top of sensor electrode 606. The rest of container 102 may be filled with fuel 720a. In FIG. 7B, at a later time, water 722b may have risen further up sensor electrode 606. The rest of container 102 may be filled with fuel 720b. When the water (722b) level is above a specified portion of sensor electrode 606, a change in capacitance may be detected by MC 120. This may be an increase in capacitance. MC 120 may interpret this increase in capacitance as a transition between fuel and water being at a given level of sensor electrode 606. Moreover, the more water 722 that is proximate to sensor electrode 606, the greater the capacitive coupling will be thereto. Thus, sensor electrode 606 provides an indication of the height of water 722 over the entire vertical range of sensor electrode 606, which may be interpreted by MC 120 to trigger an alarm at one, or more, programmable limits, without requiring additional sensor electrodes at predetermined levels.

Figure 8:
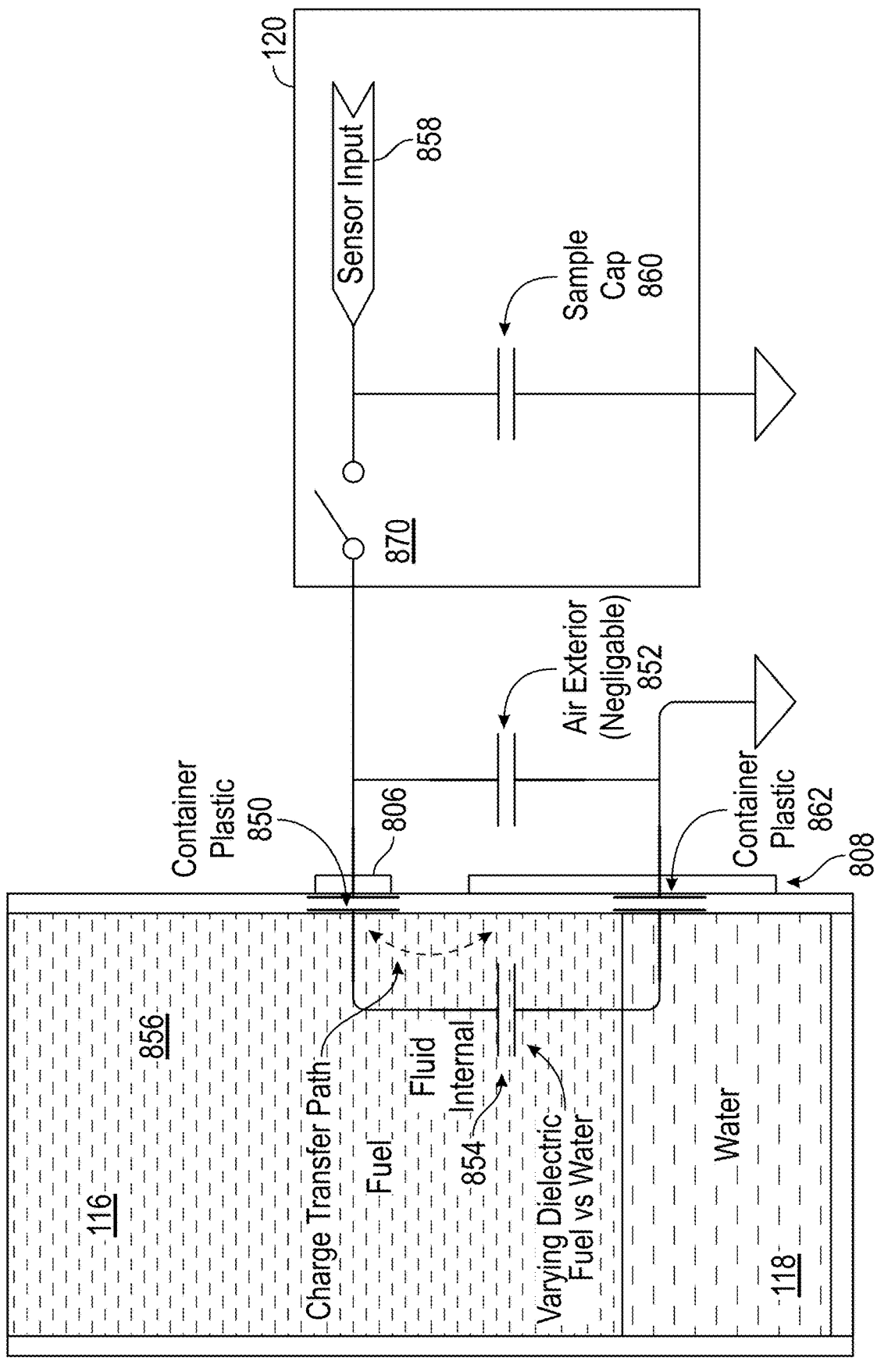
FIG. 8 is an illustration of an equivalent circuit model of a limit sensor implementation of sensor electrodes, according to examples of the present disclosure.

FIG. 8 is an illustration of an equivalent circuit model of a limit sensor implementation of sensor electrodes, according to examples of the present disclosure. The model may illustrate the general operation of the system of FIGS. 1-5. For example, sensor electrode 806 may represent any of sensor electrodes 106, 206, 406, and ground electrode 808 may represent any of ground electrodes 108, 208, 408 as attached to a side of container 102 including some fuel 116 and some water 118. In particular, sensor electrode 806 may be configured to operate as a limit sensor, wherein capacitance shifts of sensor electrode 806 may indicate whether or not water 118 has reached a vertical level corresponding to the vertical placement of sensor electrode 806.

Shown in FIG. 8 are equivalent capacitors 850, 852, 854, 862 formed by the interaction of various parts of the system. For equivalent capacitor 852, electrodes 806, 808 may act as plates and the air between electrodes 806, 808 and outside container 102 may act as a dielectric. However, the capacitance of equivalent capacitor 852 may be negligible and may be ignored for calculations discussed further below.

For equivalent capacitor 850, sensor electrode 806 may act as a first plate, the liquid such as fuel 116 (or, later, water 118) may act as a second plate, and the plastic or other substance making up the walls of container 102 may act as a dielectric. Similarly, for equivalent capacitor 862, ground electrode 808 may act as a first plate, water 118 may act as a second plate, and the plastic or other substance making up the walls of container 102 may act as a dielectric.

Moreover, equivalent capacitor 854 may be formed according to the internal fluid of container 102. The interior of container 102 that corresponds to the placement and area of sensor electrode 806 may act as a first plate, the interior of container 102 that corresponds to the placement and area of ground electrode 808 may act as a second plate, and the combination of fuel 116 and water 118 may act as the dielectric.

In other examples, wherein electrodes 806, 808 are on the inside of container 102, equivalent capacitors may be formed in a manner similar to the description above, wherein equivalent capacitor 854 is formed by electrodes 806, 808 as the plates and the combination of fuel 116 and water 118 as the dielectric; and equivalent capacitors 862, 850 are formed by respective ones of electrodes 806, 808 and exterior air as the plates with the plastic or other substance making up container 102 walls as the dielectric.

Capacitance shifts may be measured by MC 120. Example components of MC 120 are shown. When capacitance is to be measured, a switch 870 may be enabled to connect sensor electrode 806 with a charge sensor input 858 and a top plate of a sampling capacitor 860. The capacitance of sampling capacitor 860 may be known, as may be the time for which switch 870 is enabled. The amount of charge formed on the top plate of sampling capacitor 860 may be measured by charge sensor input 858, and, given this measured charge, the known capacitance of sampling capacitor 860, charge transfer may be used to evaluate voltage from sensor electrode 806.

When fuel 116 covers sensor electrode 806, very little or no charge may traverse a charge transfer path 856 between a top plate of equivalent capacitor 854 and sensor electrode 806. However, when water 118 displaces fuel 116 and water 118 covers sensor electrode 806, more charge may flow through charge transfer path 856 which may increase the capacitance of equivalent capacitor 850, which may be measured in relative terms by MC 120.

The change in relative capacitance as water 118 displaces fuel 116 may arise from difference in permittivity of the dielectric between a top plate of equivalent capacitor 854 and equivalent capacitor 850. The permittivity may change because the permittivity of fuel 116 and water 118 are different.

Figure 9:
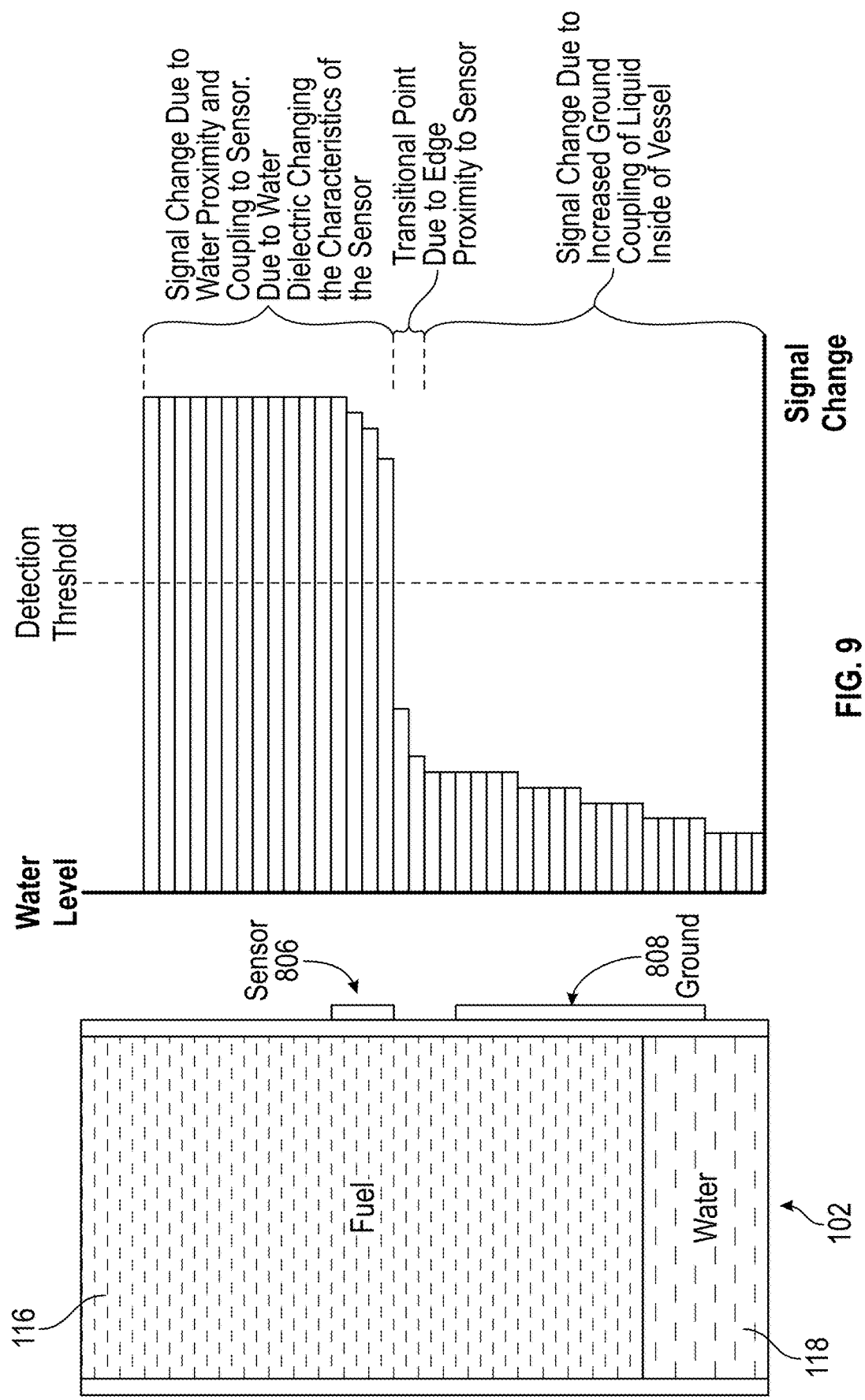
FIG. 9 is an illustration of charge that would be detected, given various levels of water compared to fuel, according to examples of the present disclosure.

FIG. 9 is an illustration of charge that would be detected by MC 120 given various levels of water 118 compared to fuel 116, according to examples of the present disclosure. Graphed in FIG. 9 is a plot of charge levels, represented by a relative change in signals detected by MC 120, at different vertical positions of a boundary between water 118 and fuel 116. The plot is illustrated next to a representation of container 120 with positions of electrodes 806, 808 shown for reference.

As the vertical level of water 118 rises, but is still less than sensor electrode 806, charge may increase or stay the same, but in any event may be below a given threshold. The given threshold may define the measurement at which MC 120 may be configured to determine that water 118 has reached the vertical level of sensor electrode 806. Change below this threshold may result from, for example, increased ground coupling of liquid inside container 102.

As shown, when the vertical level of water 118 reaches sensor electrode 806, the charge from sensor electrode 806 may greatly increase. This may reflect a transitional point at which the edge of water 118 reaches sensor electrode 806.

When water 118 exceeds sensor electrode 806, the signal change may be to water 118 proximity and coupling to sensor electrode 806. Water 118 has changed the dielectric of equivalent capacitor 854.

The capacitance of the limit sensor may be given as $$C = \frac{\epsilon A}{d} = \frac{\epsilon_0 \epsilon_r A}{d}$$

wherein C is the capacitance, E is the permittivity of the dielectric, A is the area of the plates, and d is the distance of the plates. For the system shown in FIGS. 8-9, A and d remain constant, while only the permittivity changes. The permittivity may be further defined as the product of the permittivity of free space, $\epsilon_0$, and relative permittivity, $\epsilon_r$. Water 118 may have a significantly higher relative permittivity, such as 80, compared to fuel 116, such as 4. As water 118 rises and displaces fuel 116, the higher permittivity value may be used.

Figure 10:
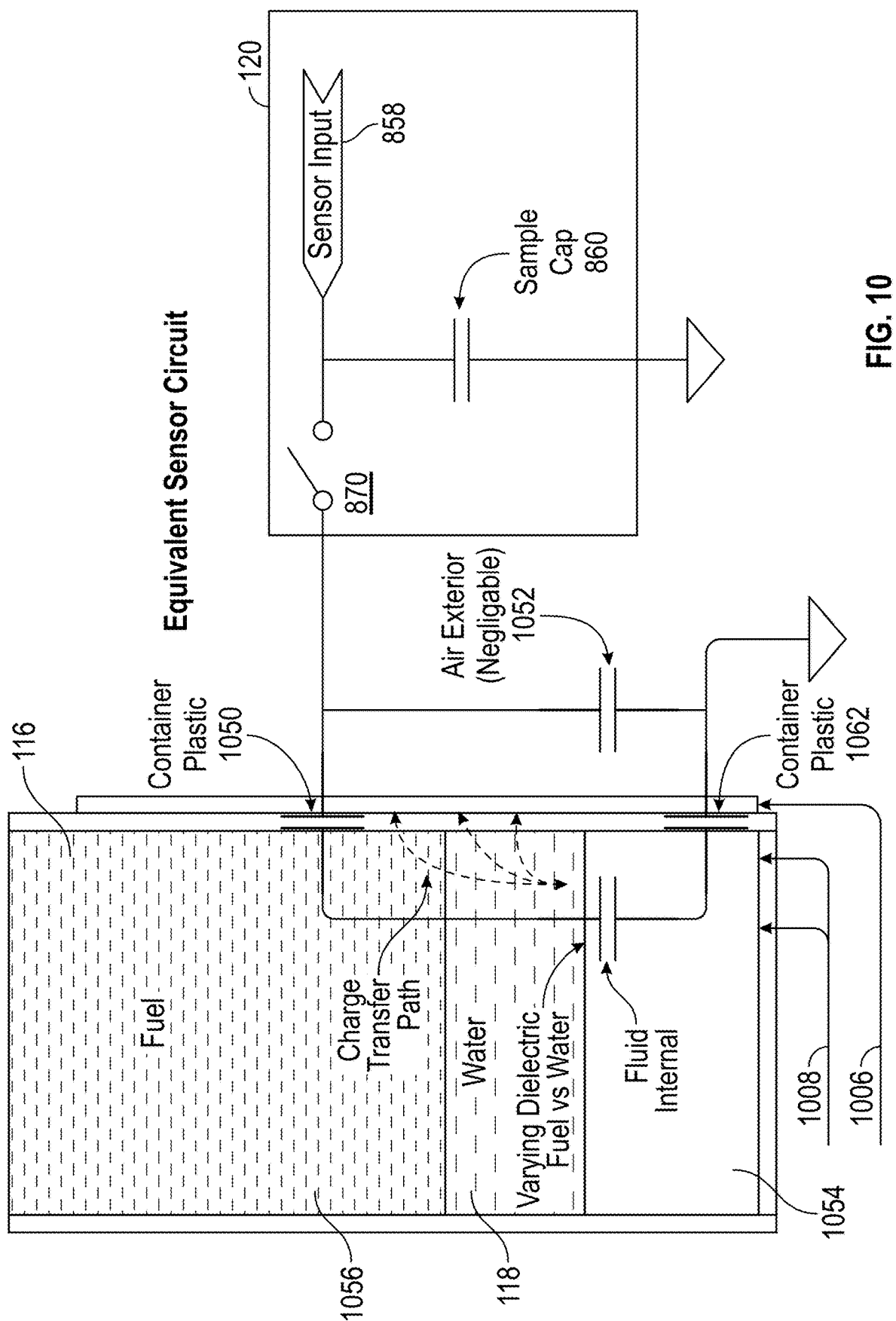
FIG. 10 is an illustration of an equivalent circuit model of a linear sensor implementation of sensor electrodes, according to examples of the present disclosure.

FIG. 10 is an illustration of an equivalent circuit model of a linear sensor implementation of sensor electrodes, according to examples of the present disclosure. The model may illustrate the general operation of the system of FIGS. 1 and 6-7. For example, sensor electrode 1006 may represent any of sensor electrodes 106 or 606, and ground electrode 1008 may represent any of ground electrodes 108, 608 as attached to a side of container 102 or inside container 102. In particular, sensor electrode 1006 may be configured to operate as a linear sensor, wherein capacitance shifts of sensor electrode 1006 may indicate a vertical level of water 118.

Shown in FIG. 10 are equivalent capacitors 1050, 1052, 1054, 1062 formed by the interaction of various parts of the system. For equivalent capacitor 1052, portions of electrode 1006 may act as plates and the air between outside container 102 may act as a dielectric. However, the capacitance of equivalent capacitor 1052 may be negligible and may be ignored for calculations discussed further below.

For equivalent capacitor 1050, sensor electrode 1006 may act as a first plate, the liquid such as fuel 116 or water 118 may act as a second plate, and the plastic or other substance making up the walls of container 102 may act as a dielectric. For equivalent capacitor 1062, ground electrode 1008 may act as a first plate, sensor electrode 1006 may act as a second plate, and the plastic or other substance making up the walls of container 102 may act as a dielectric.

Moreover, equivalent capacitor 1054 may be formed according to the internal fluid of container 102. Ground electrode 1008 may act as a first plate, sensor electrode 1006 may act as a second plate, and the combination of fuel 116 and water 118 may act as the dielectric. Moreover, In further detail, which may not be needed. The interface of the two immiscible fluids may also be considered a "plate" since they are not mixed.

As water 118 fills container 102, a larger area of sensor electrode 1006 may be covered by water 118, rather than fuel 116, affecting the capacitance measured by MC 120. Moreover, the dielectric may change as the mixture of water 118 versus fuel 116 changes, also affecting the capacitance measured by MC 120.

Figure 11:
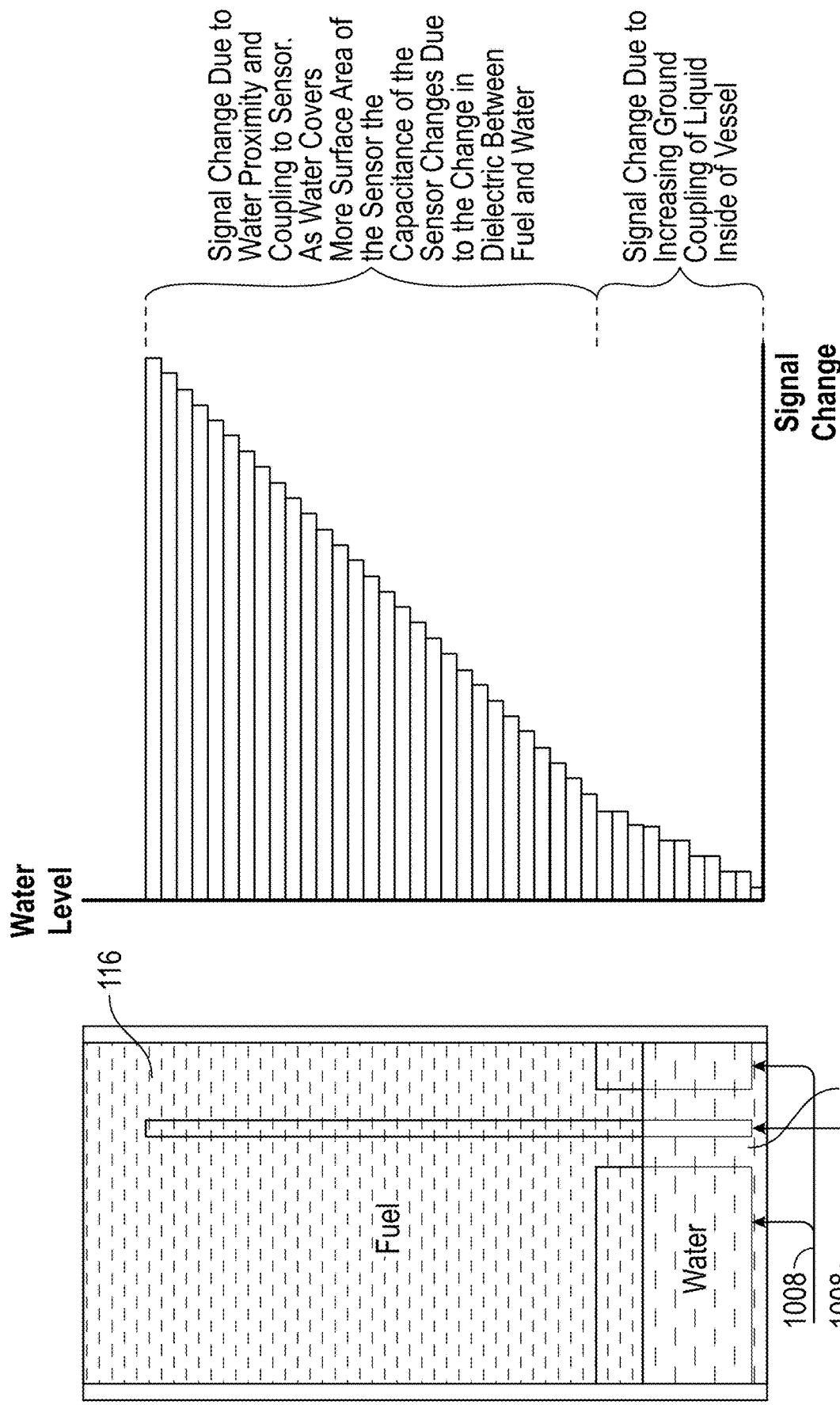
FIG. 11 is an illustration of charge that would be detected by given various levels of water compared to fuel when a linear sensor is used, according to examples of the present disclosure.

FIG. 11 is an illustration of charge that would be detected by MC 120 given various levels of water 118 compared to fuel 116 when a linear sensor is used, according to examples of the present disclosure. Graphed in FIG. 11 is a plot of charge levels, represented by a relative change in signals detected by MC 120, at different vertical positions of a boundary between water 118 and fuel 116 along sensor electrode 1006. The plot is illustrated next to a representation of container 120 with the position of electrodes 1006, 1008 shown for reference.

As the vertical level of water 118 rises, but is still less than the top of ground electrode 1008, charge may increase from, for example, increased ground coupling of liquid inside container 102. Above ground electrode 1008, as the vertical level of water 118 rises, the charge may increase due to water proximity and coupling with sensor electrode 1006. As water 118 covers more of sensor electrode 1006, more surface area of sensor electrode 1006 may be covered, and the capacitance may change due to the change in dielectric between fuel 116 and water 118.

Operation of MC 120 for any of the above examples may be implemented by a capacitive measurement charge transfer process. MC 120 may be implemented by a peripheral touch controller or capacitive voltage divider peripheral of a system or microcontroller to perform the capacitive measurement charge transfer process. Moreover, MC 120 may be implemented by an ADC (analog digital converter), ADCC (analog digital converter computation), CTMU (charge time measurement) peripherals. MC 120 may utilize a fixed capacitance of sampling capacitor 860 to measure the circuit capacitance external to MC 120 on sensor input 858.

MC 120 may perform a series of charger transfer cycles to calibrate a range of possible capacitance values on sensor input 858 to be applied later with respect to contents of container 102. The calibration process may be described by a first phase and second phase.

During the first phase, sensor input 858 may be discharged, and the equivalent capacitors to be measured may be charged. Switch 870 may be open. Next, switch 870 may be closed, connecting sensor input 858 and the equivalent capacitor of container 102 to be measured. Switch 870 may be closed for a fixed amount of time. The fixed amount of time may be used to accumulate charge on a top plate of sampling capacitor 860, and may be set in any suitable manner, such as by a timer circuit or an RC circuit. After the fixed amount of time, switch 870 may be opened to disconnect sensor input 858 and the equivalent capacitor to be measured. The voltage on sensor input 858 may be measured, which may indicate the amount of charge that was transferred over time. The voltage value may be stored as a calibrated voltage value representing container 102 when full of water 118.

During the second phase, sensor input 858 may be charged, and the equivalent capacitors to be measured may be discharged. Switch 870 may be open. Next, switch 870 may be closed, connecting sensor input 858 and the equivalent capacitor of container 102 to be measured. Switch 870 may be closed for a fixed amount of time. The fixed amount of time may be used to accumulate charge on a top plate of sampling capacitor 860, and may be set in any suitable manner, such as by a timer circuit or an RC circuit. After the fixed amount of time, switch 870 may be opened to disconnect sensor input 858 and the equivalent capacitor to be measured. The voltage on sensor input 858 may be measured, which may indicate the amount of charge that was transferred over time. The voltage value may be stored as a calibrated voltage value representing container 102 when empty of water 118. The voltage value may be an offset by which later voltage measurements are adjusted.

The two voltages may be a reference voltage for future measurements to be compared to for relative change. The two voltage values may be used as references of an undersaturation and an oversaturation value. When container 102 has some water 118, the level of water 118 may be measured by discharging sensor input 858 while opening switch 870, allowing the equivalent capacitors of container 102 to be charged. Next, switch 870 may be closed, connecting sensor input 858 and the equivalent capacitor of container 102 to be measured. Switch 870 may be closed for a fixed amount of time. The fixed amount of time may be used to accumulate charge on a top plate of sampling capacitor 860, and may be set in any suitable manner, such as by a timer circuit or an RC circuit. After the fixed amount of time, switch 870 may be opened to disconnect sensor input 858 and the equivalent capacitor of container 120 to be measured. The voltage on sensor input 858 may be measured, which may indicate the amount of charge that was transferred over time. The voltage value may be compared against the reference values to determine a relative shift in capacitance.

The reference values may be recalibrated from time to time to account for environmental changes such as temperature and humidity, or may be recorded for various temperature and humidity combinations and stored for reference given a particular temperature and humidity of container 102. Moreover, any suitable reference value may be used, including by a sensor that operates independently of temperature and humidity, or by external temperature and humidity measurement devices.

Figure 12:
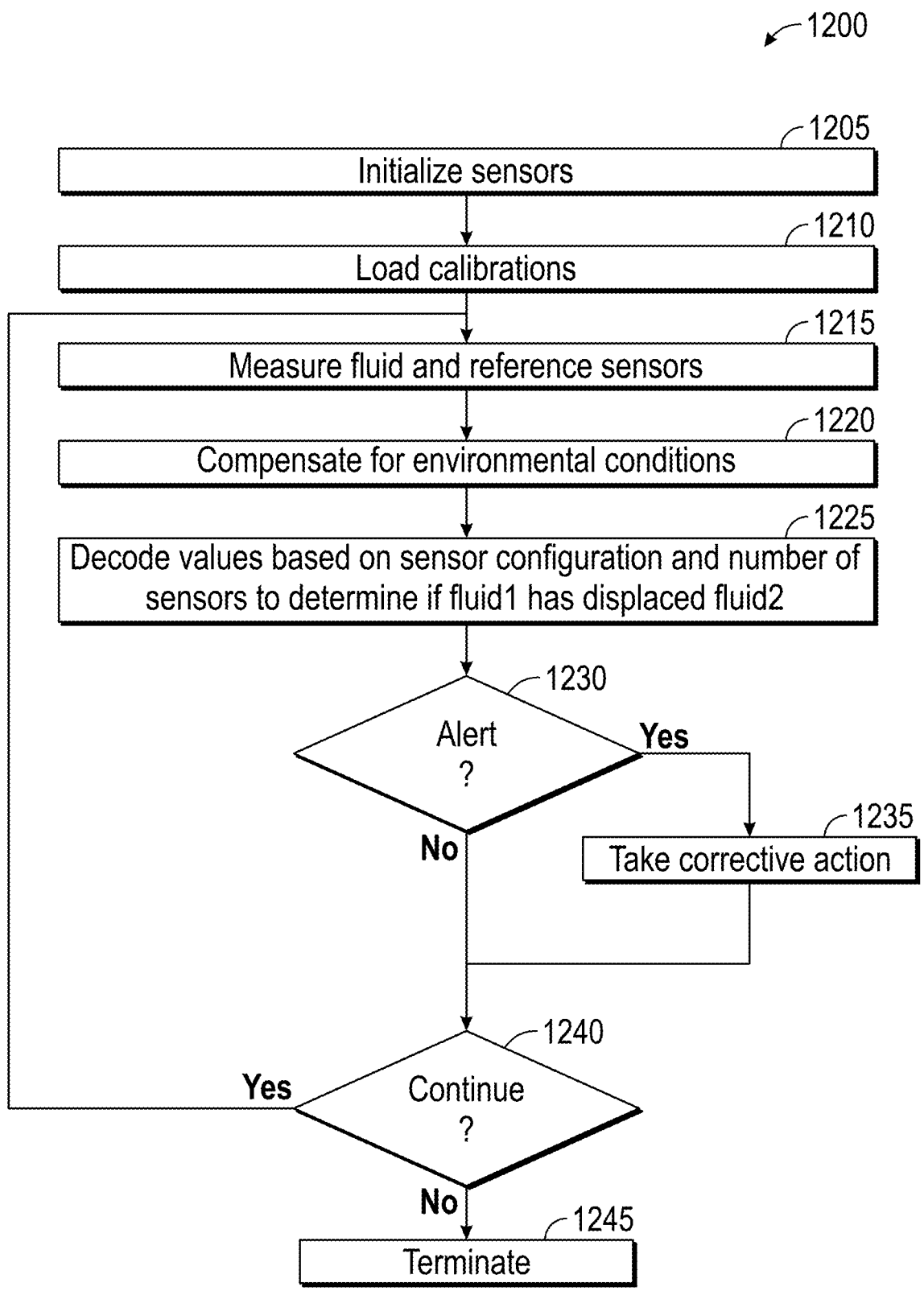
FIG. 12 is a flow diagram of a method for fluid level detection, according to specific examples of this disclosure.

FIG. 12 is a diagram of a method 1200 for fluid level detection, according to specific examples of this disclosure. Method 1200 may be performed with any suitable elements, such as system 100 as implemented by any of the implementations shown in FIGS. 1-11. In particular, method 1200 may be performed by MC 120 in combination with electrodes coupled thereto. Method 1200 may be performed in any suitable order. One or more blocks of method 1200 may be optionally repeated, omitted, skipped, or performed recursively. Method 1200 may be performed upon any suitable criteria, such as periodically. Method 1200 may begin at block 1205.

At block 1205, sensors may be initialized. This may include initializing environmental sensors, sensor electrodes, or ground electrodes.

At block 1210, calibrations may be loaded. These may include calibration values for various sensors. The calibration values may specify capacitance values that are experienced at a given sensor for various fluids, or given environmental conditions.

At block 1215, capacitance values for sensor electrodes, the ground electrode, and environmental sensors may be measured. This may be a relative capacitance between each sensor electrode and the ground electrode as affected by coupled fluids on the other side of a container wall. This may be performed in any suitable manner. This may be performed, for example, using charge transfer processes. This may include a series of processes using charge share as a method of measuring relative capacitance. This may include PTC, CVD, ADC, ADC with computation, CTMU, or capacitive sensing module (CDM) techniques or implementations. Filtering, amplification, or any other suitable signal conditioning may be used on the values.

At block 1220, environmental conditions may be compensated for using, for example, calibrations from block 1210.

At block 1225, signal values from the electrodes may be decoded. These values may be decoded on the basis of sensor configuration and the number of sensor electrodes of the system. These values may be decoded to determine if a first fluid, fluid1, such as water, has displaced a second fluid, fluid2, such as diesel fuel.

Figure 13:
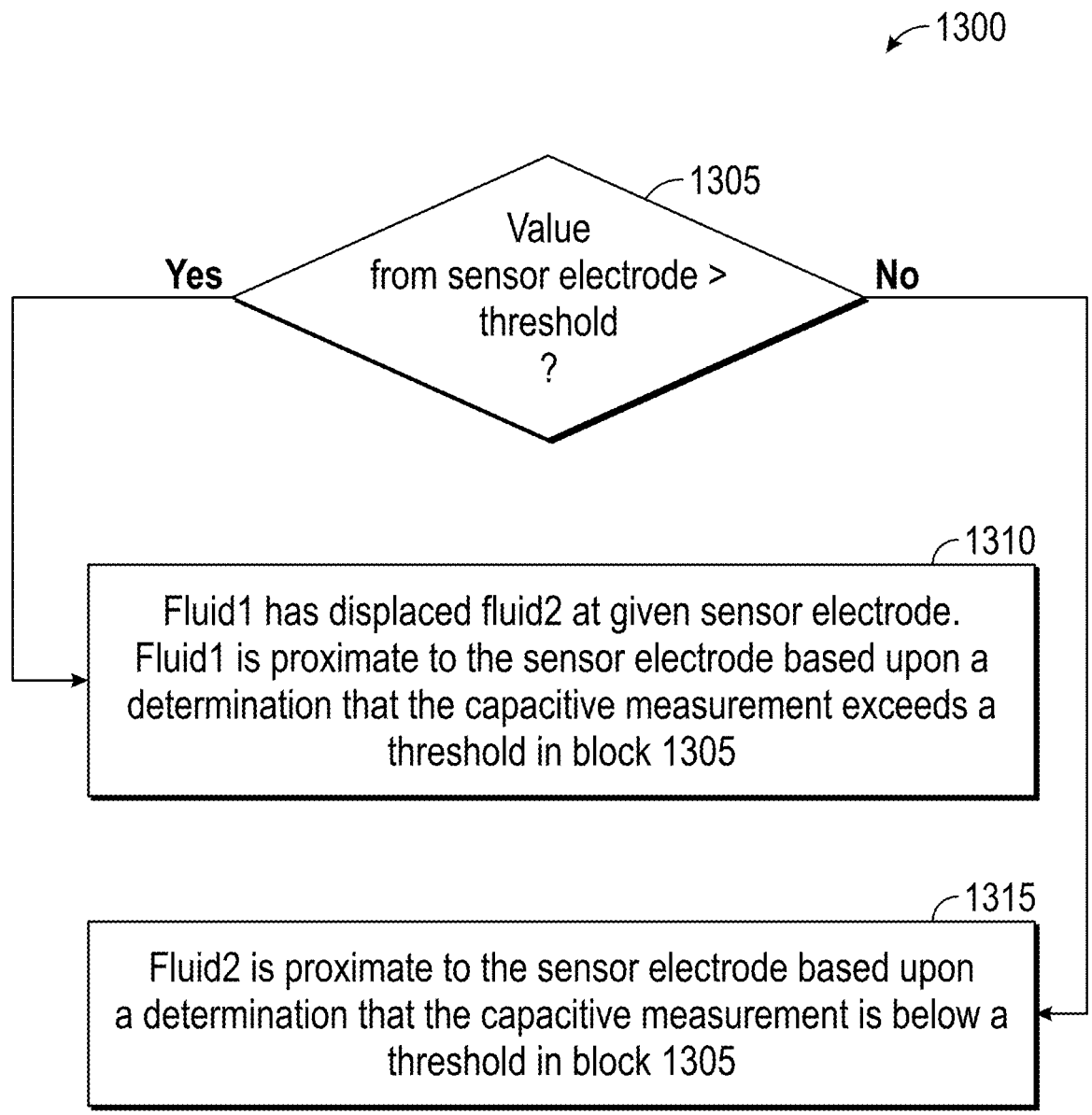
FIG. 13 is a flow diagram of a method for binary detection of fluid level with a single sensor electrode, according to examples of this disclosure.
Figure 14:
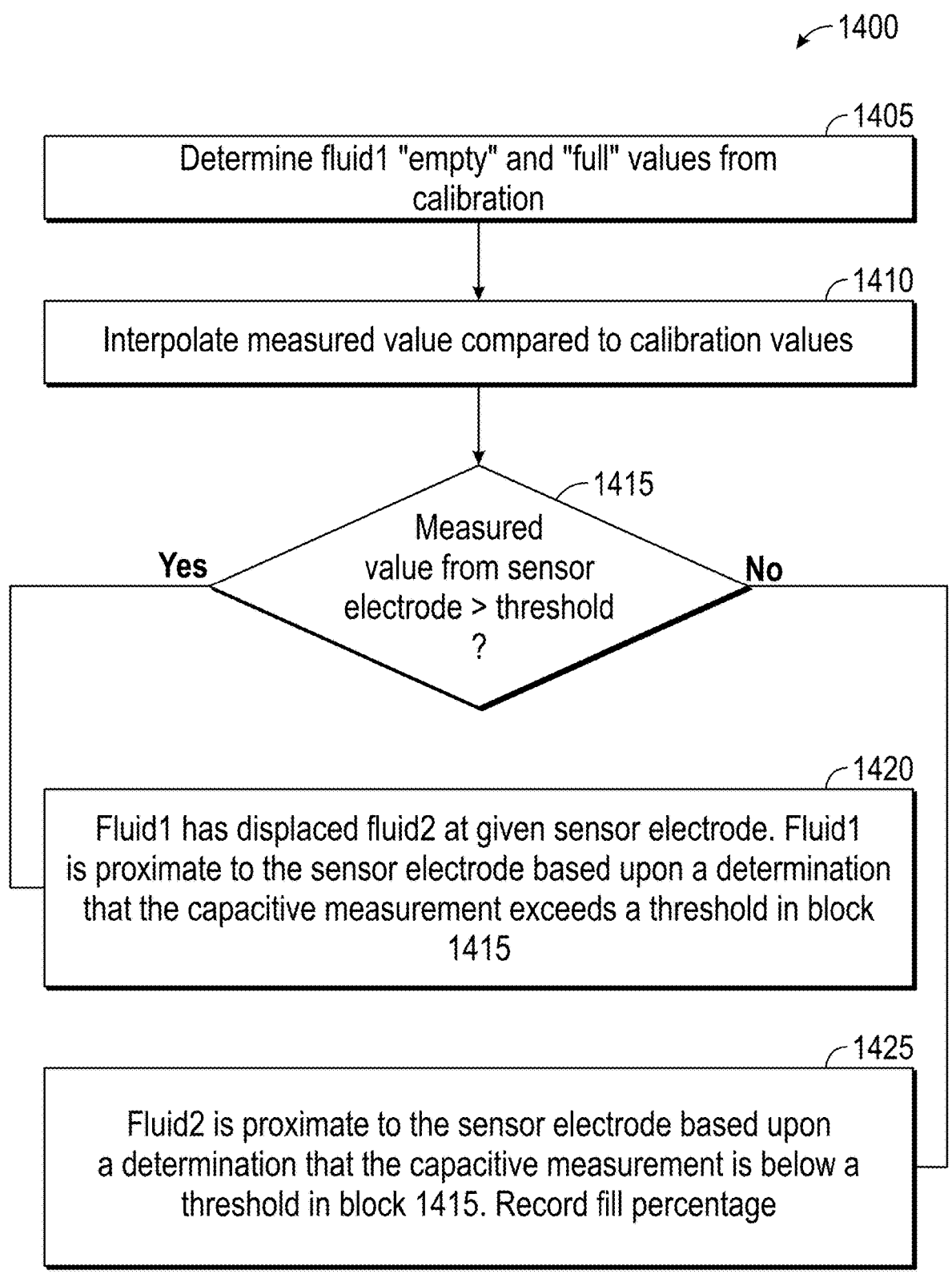
FIG. 14 is a flow diagram of a method for linear detection of fluid level with a single sensor electrode, according to examples of this disclosure.
Figure 15:
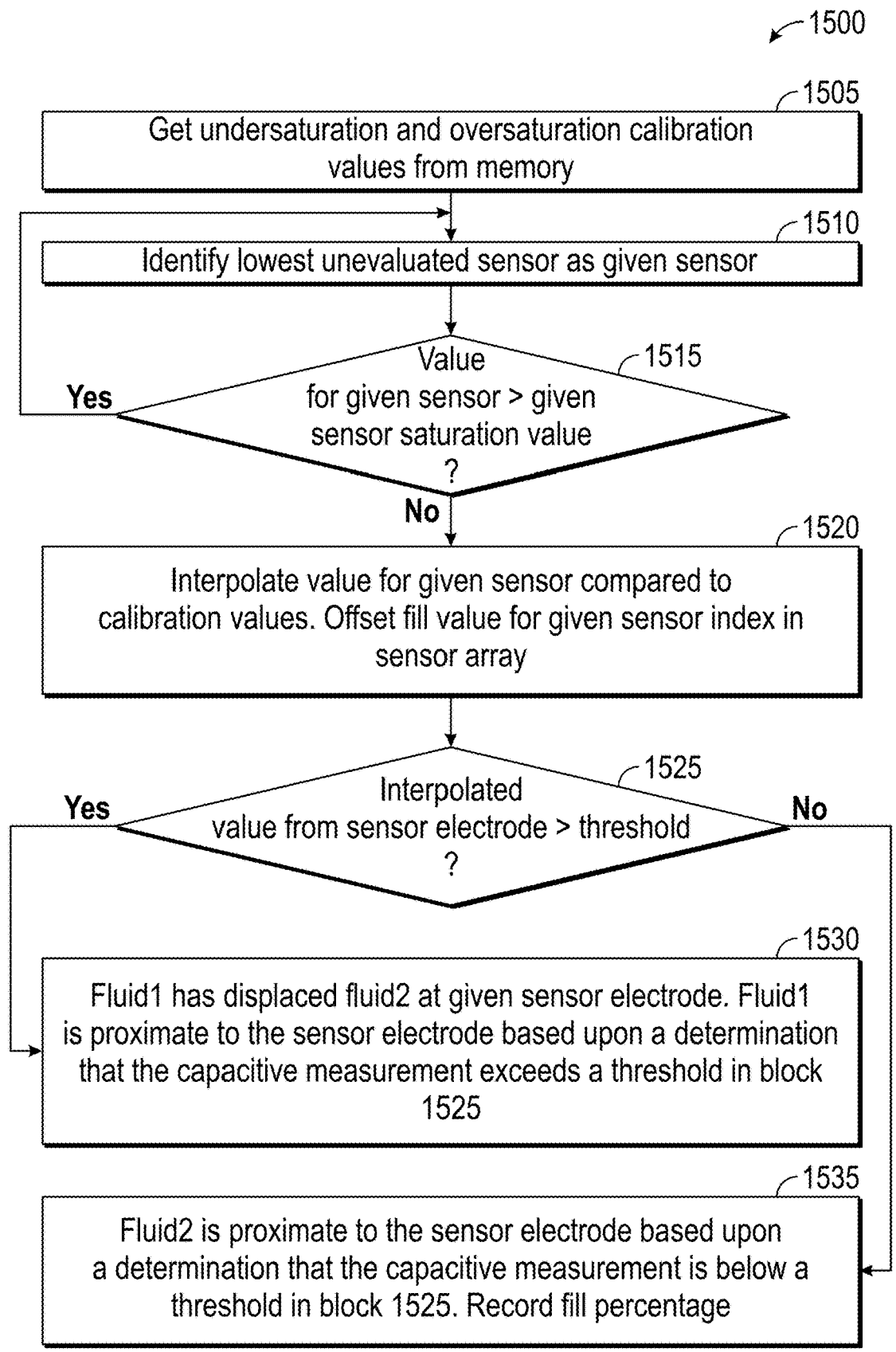
FIG. 15 is a flow diagram of a method for linear detection of fluid level with multiple sensor electrodes, according to examples of this disclosure.

Block 1225 may be implemented in any suitable manner. FIGS. 13-15 illustrate example implementations of block 1225. FIG. 13 illustrates an example implementation of block 1225 for binary detection of the first fluid. A single instance of a sensor electrode, such as shown by sensor electrode 206, 406 in FIGS. 2-5, may be used. Such an implementation may indicate whether the container is deemed to be sufficiently full of the first fluid, or not. FIG. 14 illustrates an example implementation of block 1225 for linear detection of the first fluid. A linear sensor, such as sensor electrode 606 of FIGS. 6-7, may be used. Such an implementation may indicate, for the first fluid, a percentage of the container that is full. FIG. 15 illustrates an example implementation of block 925 for linear detection of the first fluid. Multiple instances of a sensor electrode, such as shown by sensors 106A-106N in FIG. 1, may be used. Such an implementation may indicate, for the first fluid, a percentage of the container that is full.

Block 1225 may return an indication of whether or not the level of the first fluid has reached a predetermined limit. This may be in the form of an alert such as a flag, register value, message, or other suitable indication. Moreover, an indication of a percentage of the container that is filled with the first fluid may be returned.

At block 1230, it may be determined whether the indication from block 1225 indicates that the level of the first fluid has reached the predetermined limit. If so, method 1200 may proceed to block 1235. Otherwise, method 1200 may proceed to block 1240.

At block 1235, any suitable corrective action may be taken, if necessary, such as by automatically draining the container, issuing an alert, or notifying a user of the system. Method 1200 may proceed to block 1240.

At block 1240, it may be determined whether or not method 1200 will continue. If so, method 1200 may return to block 1215. Otherwise, method 1200 may terminate at block 1245.

FIG. 13 is a diagram of a method 1300 for binary detection of fluid level with a single sensor electrode, according to examples of this disclosure. Method 1300 may implement, fully or in part, block 1225 of method 1200. Method 1300 may be performed with any suitable elements, such as system 100 as implemented by any of the implementations shown in FIGS. 1-5. In particular, method 1300 may be performed by MC 120 in combination with electrodes coupled thereto. Method 1300 may be performed in any suitable order. One or more blocks of method 1300 may be optionally repeated, omitted, skipped, or performed recursively. Method 1300 may be performed upon any suitable criteria, such as periodically. Method 1300 may begin at block 1305.

At block 1305, it may be determined whether the value returned from the sensor electrode is greater than a threshold. The threshold may be defined in terms of a rise relative to a previous or known reference value. The threshold may be defined in absolute terms. The threshold may be defined according to a capacitance value that is caused by a first fluid, such as water, displacing the second fluid, such as fuel, at the sensor electrode.

If the value is greater than the threshold, method 1300 may proceed to block 1310. Otherwise, method 1300 may proceed to block 1315.

At block 1310, it may be determined that the first fluid has displaced the second fluid at a level corresponding to the given sensor electrode, and that the first fluid is proximate to the given sensor electrode, based upon the change in capacitance that has reached the threshold in block 1305. An indication that the level of the first fluid has reached the predetermined limit may be set. This may be in the form of an alert such as a flag, register value, message, or other suitable indication. A vertical position of an interface between the first fluid and the second fluid may be determined. This interface may arise from the separation of the first fluid and the second fluid. This interface may indicate a level of the first fluid in the container as it has displaced the second fluid. It may be determined that the first fluid is proximate to the single sensor electrode, and thus the interface between the first fluid and the second fluid is at least as high as the position of the single sensor electrode.

At block 1315, it may be determined that the second fluid is proximate to the given sensor electrode, based upon the determination that capacitance has not reached the threshold in block 1305. It may be determined that the interface between the first fluid and the second fluid is not as high as the position of the single sensor electrode. The indication that the level of the first fluid has reached the predetermined limit is therefore not set.

FIG. 14 is a diagram of a method 1400 for linear detection of fluid level with a single sensor electrode, according to examples of this disclosure. Method 1400 may implement, fully or in part, block 1225 of method 1200. Method 1400 may be performed with any suitable elements, such as system 100 as implemented by any of the implementations shown above. In particular, method 1400 may be performed by MC 120 in combination with electrodes coupled thereto, such as sensor electrode 606. Method 1400 may be performed in any suitable order. One or more blocks of method 1400 may be optionally repeated, omitted, skipped, or performed recursively. Method 1400 may be performed upon any suitable criteria, such as periodically. Method 1400 may begin at block 1405.

At block 1405, values corresponding to "empty" and "full" with respect to fluids and values to be returned from the sensor electrode may be determined. These values may be determined from calibration settings based on the container, placement and size of the electrodes, and the fluids to be evaluated.

At block 1410, the measured value from the sensor electrode may be interpolated between the "empty" and "full" values to determine a percentage of the container (defined as between the vertical positions of the ground electrode and the sensor electrode) that is full of the first fluid.

At block 1415, it may be determined whether the value returned from the sensor electrode is greater than a threshold. The threshold may be defined in terms of a rise relative to a previous or known reference value. The threshold may be defined in absolute terms. The threshold may be defined according to a capacitance value that is caused by a first fluid, such as water, displacing the second fluid, such as fuel, at the sensor electrode.

If the value is greater than the threshold, method 1400 may proceed to block 1420. Otherwise, method 1400 may proceed to block 1425.

At block 1420, it may be determined that the first fluid has displaced the second fluid at a level corresponding to the given sensor electrode, and that the first fluid is proximate to the given sensor electrode, based upon the change in capacitance that has reached the threshold in block 1415. An indication that the level of the first fluid has reached the predetermined limit may be set. This may be in the form of an alert such as a flag, register value, message, or other suitable indication. A vertical position of an interface between the first fluid and the second fluid may be determined. This interface may arise from the separation of the first fluid and the second fluid. This interface may indicate a level of the first fluid in the container as it has displaced the second fluid. The interface between the first fluid and the second fluid may be at least as high as the position of the single sensor electrode.

At block 1425, it may be determined that the second fluid is proximate to the given sensor electrode, based upon the determination that capacitance has not reached the threshold in block 1415. The percentage of the container that is filled with the first fluid may be stored or reported. The percentage of the container may further provide a vertical position between the first fluid and the second fluid. The indication that the level of the first fluid has reached the predetermined limit is therefore not set.

FIG. 15 is a diagram of a method 1500 for linear detection of fluid level with multiple sensor electrodes, according to examples of this disclosure.

Method 1500 may implement, fully or in part, block 1225 of method 1200. Method 1500 may be performed with any suitable elements, such as system 100 as implemented by any of the implementations shown above. In particular, method 1500 may be performed by MC 120 in combination with electrodes coupled thereto. Method 1500 may be performed in any suitable order. One or more blocks of method 1500 may be optionally repeated, omitted, skipped, or performed recursively. Method 1500 may be performed upon any suitable criteria, such as periodically. Method 1500 may begin at block 1505.

At block 1505, undersaturation and oversaturation calibration values may be read from memory. The values may correspond to the sensor electrodes used in the system. Each instance of a sensor electrode may include respective undersaturation and oversaturation calibration values.

At block 1510, the sensor electrode with the lowest vertical position that has not yet been evaluated may be identified as a given sensor electrode to be evaluated in the blocks described below.

At block 1515, it may be determined if the measured value from the given sensor electrode is greater than a saturation value for the given sensor electrode. This may indicate that the liquid level is greater than the given sensor electrode.

If so, method 1500 may return to block 1510. Otherwise, method 1500 may proceed to block 1520.

At block 1520, based on the sensor electrode which had a measured value greater than a saturation value, the measured value may be interpolated compared to calibration values of individual sensor electrodes. This may result in a percentage of the container (defined as between the vertical positions of the ground electrode and the highest sensor electrode) that is full of the first fluid.

At block 1525, it may be determined whether the interpolated value returned from block 1520 is greater than a threshold. The threshold may be defined in terms of a rise relative to a previous or known reference value. The threshold may be defined in absolute terms. The threshold may be defined according to a capacitance value that is caused by a first fluid, such as water, displacing the second fluid, such as fuel, at the sensor electrode. If the interpolated value is greater than the threshold, method 1500 may proceed to block 1530. Otherwise, method 1500 may proceed to block 1535.

At block 1530, it may be determined that the first fluid has displaced the second fluid at a level corresponding to the given sensor electrode, and that the first fluid is proximate to the given sensor electrode, based upon the change in capacitance that has reached the threshold in block 1515. An indication that the level of the first fluid has reached the predetermined limit may be set. This may be in the form of an alert such as a flag, register value, message, or other suitable.

At block 1535, it may be determined that the second fluid is proximate to the given sensor electrode, based upon the determination that capacitance has not reached the threshold in block 1115. The percentage of the container that is filled with the first fluid may be stored or reported.

The present disclosure has been described in terms of one or more examples, and it should be appreciated that many equivalents, alternatives, variations, and modifications, aside from those expressly stated, are possible and within the scope of the disclosure. While the present disclosure is susceptible to various modifications and alternative forms, specific examples thereof have been shown in the drawings and are herein described in detail. It should be understood, however, that the description herein of specific examples is not intended to limit the disclosure to the particular forms disclosed herein.

What is claimed is:

1. An apparatus, comprising a measurement circuit to be coupled to a first sensor electrode of a first vertical position of a container, the container to include a first fluid and a second fluid, the measurement circuit to:
   perform a capacitive measurement at the first sensor electrode to determine whether the first fluid or the second fluid is proximate to the first sensor electrode;
   determine that the first fluid is proximate to the first sensor electrode based upon a determination that the capacitive measurement exceeds a capacitance threshold, the capacitance threshold of a known capacitance of a given fluid; and
   determine that the second fluid is proximate to the first sensor electrode based upon a determination that the capacitive measurement is below the capacitance threshold, so as to make a determination of a height of the first fluid with respect to the second fluid based on a capacitive measurement of the first sensor electrode.

2. The apparatus of claim 1, wherein the measurement circuit is to be coupled to a ground electrode of the container, the ground electrode to provide a ground reference for the capacitive measurement of the first sensor electrode.

3. The apparatus of claim 1, wherein the first fluid and the second fluid are immiscible with respect to one another.

4. The apparatus of claim 1, wherein the first fluid is of a different dielectric value than the second fluid.

5. The apparatus of claim 1, wherein the measurement circuit is to:
   be coupled to a second sensor electrode of a second vertical position of the container, the second vertical position above the first vertical position;
   perform a capacitive measurement of the second sensor electrode; and
   based upon a determination of the capacitive measurements of the first and second sensor electrodes, determine a vertical position of an interface between the first fluid and the second fluid.

6. The apparatus of claim 1, wherein the first sensor electrode is to be capacitively coupled to a one of the first fluid or the second fluid that is proximate to the first sensor electrode.

7. The apparatus of claim 1, wherein the first sensor electrode is formed as a band around a circumference of the container.

8. The apparatus of claim 7, wherein the first sensor electrode includes a height that is greater than a wall thickness of the container.

9. The apparatus of claim 1, wherein the ground node is formed as a band around a circumference of the container.

10. The apparatus of claim 1, wherein the ground node and the first sensor electrode are formed within an enclosure within the container.

11. The apparatus of claim 1, wherein:
    the ground node is formed around a circumference of the container; and
    the first sensor electrode is formed as a vertical sensor rising from within a gap in the ground node.

12. A method, comprising:
    receiving a first signal from a first sensor electrode of a first vertical position of a container, the container including a first fluid and a second fluid;
    determining that the first fluid is proximate to the first sensor electrode based upon a determination that the capacitive measurement exceeds a capacitance threshold, the capacitance threshold of a known capacitance of a given fluid; and
    determining that the second fluid is proximate to the first sensor electrode based upon a determination that the capacitive measurement is below the capacitance threshold, for determining a height of the first fluid with respect to the second fluid based on a capacitive measurement of the first sensor electrode.

13. The method of claim 12, comprising:
    receiving a second signal from a ground electrode of the container, the ground electrode providing a ground reference for the capacitive measurement of the first sensor electrode.

14. The method of claim 12, wherein the first fluid and the second fluid are immiscible with respect to one another.

15. The method of claim 12, wherein the first fluid is of a different dielectric value than the second fluid.

16. The method of claim 12, comprising:

performing a capacitive measurement of a second sensor electrode of a second vertical position of the container, the second vertical position above the first vertical position; and based upon a determination of the capacitive measurements of the first and second sensor electrodes, determining a vertical position of an interface between the first fluid and the second fluid.

17. The method of claim 12, comprising capacitively coupling to a one of the first fluid or the second fluid that is proximate to the first sensor electrode.

* * * * *